US007575513B2

(12) United States Patent
Strom

(10) Patent No.: US 7,575,513 B2
(45) Date of Patent: Aug. 18, 2009

(54) DOUBLE DRAW POKER-TYPE REEL-TYPE GAMING SYSTEM

(75) Inventor: Mark Anthony Strom, Auckland (NZ)

(73) Assignee: Native Games Entertainment International, Ltd, Auckland (NZ)

( * ) Notice: Subject to any disclaimer, the term of this patent is extended or adjusted under 35 U.S.C. 154(b) by 319 days.

(21) Appl. No.: 11/353,371

(22) Filed: Feb. 14, 2006

(65) Prior Publication Data

US 2006/0194629 A1 Aug. 31, 2006

Related U.S. Application Data

(63) Continuation-in-part of application No. 11/062,105, filed on Feb. 18, 2005, which is a continuation-in-part of application No. 10/643,002, filed on Aug. 18, 2003, now Pat. No. 7,329,180.

(51) Int. Cl.
*G06F 17/00* (2006.01)
*G06F 19/00* (2006.01)

(52) U.S. Cl. ............................ 463/13; 463/11; 463/12; 463/16; 463/20; 273/292

(58) Field of Classification Search ............ 463/11-13, 463/16, 20
See application file for complete search history.

(56) References Cited

U.S. PATENT DOCUMENTS

| | | | | |
|---|---|---|---|---|
| 4,448,419 A | | 5/1984 | Telnaes | 463/21 |
| 5,395,111 A | * | 3/1995 | Inoue | 273/143 R |
| 6,056,642 A | * | 5/2000 | Bennett | 463/20 |
| 6,261,178 B1 | | 7/2001 | Bennett | 463/20 |
| 6,471,587 B1 | | 10/2002 | Wood et al. | 463/13 |
| 6,517,432 B1 | | 2/2003 | Jaffe | 463/16 |
| 6,855,053 B2 | * | 2/2005 | Baerlocher | 463/16 |
| 7,210,997 B2 | * | 5/2007 | Hughs-Baird et al. | 463/20 |
| 2003/0078092 A1 | * | 4/2003 | Bennett | 463/20 |
| 2004/0229672 A1 | * | 11/2004 | Aoki et al. | 463/13 |

FOREIGN PATENT DOCUMENTS

| | | | |
|---|---|---|---|
| CA | 2 357 130 | | 9/2001 |
| GB | 2169736 A | * | 7/1986 |

* cited by examiner

*Primary Examiner*—Peter DungBa Vo
*Assistant Examiner*—Milap Shah
(74) *Attorney, Agent, or Firm*—Mark A. Litman & Associates, P.A.

(57) ABSTRACT

A method of playing a video wagering game and a video apparatus for that method are disclosed. The method may include a player placing a wager in a wagering machine having a processor; the wagering machine displaying at least a single payline of multiple frames influenced by at least two distinct indicators; the processor determining from one displayed distinct indicator on the payline whether the symbols provide at least one of at least two available different odds on the wager that are associated with an award; providing a second set of indicators associated with the payline, individual members of the second set of indicators associated with individual frames wherein predetermined combinations and/or orders of the second set of indicators are winning combinations and/or orders based on the wager; and providing the player with at least one award providing a specific multiple of at least some awards based upon the second set of indicators displayed on the payline.

16 Claims, 24 Drawing Sheets

FIGURE 2A

| | | | | |
|---|---|---|---|---|
| ACE ♠ | KING ♠ | QUEEN ♠ | JACK ♠ | TEN ♠ |

FIGURE 2B

| | | | | |
|---|---|---|---|---|
| TEN ♠ | JACK ♠ | QUEEN ♠ | KING ♠ | ACE ♠ |

FIGURE 2C

| | | | | |
|---|---|---|---|---|
| ACE ♠ | KING ♣ | JACK ♥ | JACK ♦ | QUEEN ♦ |

FIGURE 2D

| | | | | |
|---|---|---|---|---|
| KING♥ | ACE ♥ | JACK ♠ | JACK ♦ | QUEEN ♣ |

FIGURE 2E

| | | | | |
|---|---|---|---|---|
| JACK ♦ | KING ♦ | ACE ♦ | JACK ♦ | QUEEN ♦ |

ROYAL SPOIL

PAYTABLE

| HANDS | ♠ | ♣ | ♦ | ♥ | PERCENT PAY BACK | HIT FREQ | TOTAL HITS | TOTAL PAYS |
|---|---|---|---|---|---|---|---|---|
| A·K·Q·J·10 | 200 | 400 | 600 | 1000 | | | | |
| 10·J·Q·K·A | 100 | 200 | 300 | 500 | | | | |
| A·K·Q | 50 | 100 | 150 | 250 | | | | |
| A·K Q·J | 20 | 40 | 60 | 100 | | | | |
| A K·Q | 8 | 16 | 24 | 40 | | | | |
| A·K | 4 | 8 | 12 | 20 | | | | |
| K·A | 2 | 4 | 6 | 10 | | | | |
| ACE | 1 | 2 | 3 | 5 | | | | |
| $REEL_1$ FLUSH | 6 | 12 | 18 | 30 | 92.86% | 22.68% | 2,721,030 | 11,143,440 |
| $REEL_2$ FLUSH | 3 | 6 | 9 | 15 | 91.90% | 22.99% | 2,758,230 | 11,028,240 |
| $REEL_3$ FLUSH | 6 | 12 | 18 | 30 | 105.61% | 26.66% | 3,198,630 | 12,672,720 |

TAKE 97.25%

The Pay Table represents a SINGLE credit bet.

By DOUBLING or TRIPLING the bet, you DOUBLE or TREBLE the Pay Table amount shown.

FIG. 3

| REELS | Reel 1 | Reel 2 | Reel 3 | Reel 4 | Reel 5 | | |
|---|---|---|---|---|---|---|---|
| **Five Reel** | Ace | King | Queen | Jack | Ten | **Total** | **Red** |
| heart | 1 | 2 | 1 | 2 | 2 | 8 | 664 |
| diamond | 2 | 2 | 2 | 3 | 2 | 48 | **Black** |
| club | 3 | 3 | 3 | 2 | 3 | 162 | 8220 |
| spade | 4 | 3 | 4 | 3 | 3 | 432 | |
| **Total** | 10 | 10 | 10 | 10 | 10 | 650 | |

| **Four Reel** | Ace | King | Queen | Jack | Ten | **Total** | **Red** |
|---|---|---|---|---|---|---|---|
| heart | 1 | 2 | 1 | 2 | 2 | 32 | 856 |
| diamond | 2 | 2 | 2 | 3 | 2 | 192 | **Black** |
| club | 3 | 3 | 3 | 2 | 3 | 378 | 4494 |
| spade | 4 | 3 | 4 | 3 | 3 | 1008 | |
| **Total** | 10 | 10 | 10 | 10 | 10 | 1610 | |

| **Three Reel** | Ace | King | Queen | Jack | Ten | **Total** | **Red** |
|---|---|---|---|---|---|---|---|
| heart | 1 | 2 | 1 | 2 | 2 | 160 | 1080 |
| diamond | 2 | 2 | 2 | 3 | 2 | 560 | **Black** |
| club | 3 | 3 | 3 | 2 | 3 | 2160 | 9180 |
| spade | 4 | 3 | 4 | 3 | 3 | 3360 | |
| **Total** | 10 | 10 | 10 | 10 | 10 | 6240 | |

| **Two Reel** | Ace | King | Queen | Jack | Ten | **Total** | **Red** |
|---|---|---|---|---|---|---|---|
| heart | 1 | 2 | 1 | 2 | 2 | 1800 | 0 |
| diamond | 2 | 2 | 2 | 3 | 2 | 3200 | **Black** |
| club | 3 | 3 | 3 | 2 | 3 | 6300 | 0 |
| spade | 4 | 3 | 4 | 3 | 3 | 7200 | |
| **Total** | 10 | 10 | 10 | 10 | 10 | 18500 | |

| **One Reel** | Ace | King | Queen | Jack | Ten | **Total** | **Red** |
|---|---|---|---|---|---|---|---|
| heart | 1 | 2 | 1 | 2 | 2 | 7133 | 0 |
| diamond | 2 | 2 | 2 | 3 | 2 | 14267 | **Black** |
| club | 3 | 3 | 3 | 2 | 3 | 11614 | 0 |
| spade | 4 | 3 | 4 | 3 | 3 | 15486 | |
| **Total** | 10 | 10 | 10 | 10 | 10 | 48500 | |

*Figure 6*

| # | 1 | 2 | 3 | 4 | 5 | 6 | 7 | 8 | |
|---|---|---|---|---|---|---|---|---|---|
| win | 6 | 12 | 18 | 24 | 36 | 60 | 90 | 150 | OO |
| place | 3 | 6 | 9 | 12 | 18 | 30 | 45 | 75 | TT |
| show | 2 | 4 | 6 | 8 | 12 | 20 | 30 | 45 | JJ |
| | HOTPOT | FAVORITE | INSIDE | UNDERS | OVERS | OUTSIDE | LONGSHOT | BOILOVER | |
| breed | 6 | 12 | 18 | 24 | 36 | 60 | 90 | 150 | 3xRUN. |
| own | 4 | 6 | 12 | 18 | 24 | 36 | 60 | 90 | O |
| train | 3 | 4 | 9 | 12 | 18 | 24 | 36 | 60 | T |
| ride | 2 | 3 | 5 | 6 | 9 | 15 | 24 | 45 | J |

*Figure 12*

| | | | | | |
|---|---|---|---|---|---|
| CLASS | Crown | Open | Handicap | Maiden | MULTI |
| | x8 | x5 | x3 | x2 | |
| color | 10 | 2 | 1 | - | pays |

| | 1 | 2 | 3 | 4 | 5 | 6 | 7 | 8 | |
|---|---|---|---|---|---|---|---|---|---|
| win | 6 | 12 | 18 | 24 | 36 | 60 | 90 | 150 | OO |
| place | 3 | 6 | 9 | 12 | 18 | 30 | 45 | 75 | TT |
| show | 2 | 4 | 6 | 8 | 12 | 20 | 30 | 45 | JJ |
| | HOTPOT | FAVORITE | INSIDE | UNDERS | OVERS | OUTSIDE | LONGSHOT | BOILOVER | |
| breed | 6 | 12 | 18 | 24 | 36 | 60 | 90 | 150 | 3xRUN. |
| own | 4 | 6 | 12 | 18 | 24 | 36 | 60 | 90 | O |
| train | 3 | 4 | 9 | 12 | 18 | 24 | 36 | 60 | T |
| ride | 2 | 3 | 5 | 6 | 9 | 15 | 24 | 45 | J |

| | | | | | | | |
|---|---|---|---|---|---|---|---|
| quinella | 20 | double | 25 | exacta | 40 | trifecta | 50 |
| JJ/O or T | | TT/O or J | | OO/T or J | | OTJ | |

*Figure 7AA*

| | | | | | |
|---|---|---|---|---|---|
| CLASS | Crown | Open | Handicap | Maiden | MULTI |
| | x8 | x5 | x3 | x2 | |

*Figure 7AB*

| | | | | | |
|---|---|---|---|---|---|
| color | 10 | 2 | 1 | - | pays |

*Figure 7BC*

| | | | |
|---|---|---|---|
| STAKES | 10 | 80 | 400 |

*Figure 7CA*

| # | 1 | 2 | 3 | 4 | 5 | 6 | 7 | 8 | |
|---|---|---|---|---|---|---|---|---|---|
| win | 6 | 12 | 18 | 24 | 36 | 60 | 90 | 150 | OO |
| place | 3 | 6 | 9 | 12 | 18 | 30 | 45 | 75 | TT |
| show | 2 | 4 | 6 | 8 | 12 | 20 | 30 | 45 | JJ |
| | HOTPOT | FAVORITE | INSIDE | UNDERS | OVERS | OUTSIDE | LONGSHOT | BOILOVER | |
| breed | 6 | 12 | 18 | 24 | 36 | 60 | 90 | 150 | 3xRUN. |
| own | 4 | 6 | 12 | 18 | 24 | 36 | 60 | 90 | O |
| train | 3 | 4 | 9 | 12 | 18 | 24 | 36 | 60 | T |
| ride | 2 | 3 | 5 | 6 | 9 | 15 | 24 | 45 | J |

*Figure 7DA*

| quinella | 20 | double | 25 | exacta | 40 | trifecta | 50 |
|---|---|---|---|---|---|---|---|
| JJ/O or T | | TT/O or J | | OO/T or J | | OTJ | |

*Figure 7EA*

| Scratching Rules | 1.'Hotpot' is exempt 2.Maximum of 5 runners 3.Overs are >or=Unders |
|---|---|

*Figure 8AA*

The Outer Card Deck

| Color | Card 1 | Card 2 | Card 3 | Cycles |
|---|---|---|---|---|
| Crown | 1 | 1 | 1 | 1 |
| aqua | 2 | 2 | 2 | 8 |
| orange | 3 | 3 | 3 | 27 |
| rose | 4 | 4 | 4 | 64 |
| Total | 10 | 10 | 10 | 1000 |

Fig. 9AA

| Ranks | Make-up of Winning Combinations | Type |
|---|---|---|
| Owner | 3 x Owners | Stake |
| Trainer | 3 x Trainers | Stake |
| Jockey | 3 x Jockeys | Stake |
| Trifecta | 1 Owner - 1 Trainer - 1 Jockey | Exotic |
| Exacta | Pair of Owners with a Trainer or a Jockey | Exotic |
| Double | Pair of Trainers with an Owner or a Jockey | Exotic |
| Quinella | Pair of Jockeys with an Owner or a trainer | Exotic |
| Win | Pair of Owners and a Runner | Tote |
| Place | Pair of Trainers and a Runner | Tote |
| Show | Pair of Jockeys and a Runner | Tote |
| Breed | 3 x Same Runner | Tote |
| Own | An Owner with a pair of the same Runner | Tote |
| Train | A Trainer with a pair of the same Runner | Tote |
| Ride | A Jockey with a pair of the same Runner | Tote |

Fig.10AA

DOUBLE DRAW POKER-TYPE REEL-TYPE GAMING SYSTEM

RELATED APPLICATION DATA

This Application claims priority as a continuation-in-part application from U.S. patent application Ser. No. 11/062,105, filed Feb. 18, 2005, and entitled "REEL-TYPE GAMING SYSTEM", which is in turn a continuation-in-part application of U.S. patent application Ser. No. 10/643,002, filed Aug. 18, 2003, entitled "GAMING SYSTEM WITH MULTIPLE GENERIC AND SUBGENERIC CHARACTERISTICS", and issued as U.S. Pat. No. 7,329,180 on Feb. 12, 2008.

BACKGROUND OF THE INVENTION

1. Field of the Invention

The present invention relates to the field of gaming equipment, particularly reel-type gaming equipment in mechanical or video format, and video games that may use an ordered array of symbols to provide paylines.

2. Background of the Art

Slot-type games (both Mechanical slots with wheels or reels that rotate about an axis or Video slots that display virtual reels with symbols thereon) are important components of the entertainment provided by casinos and are equally important centers of profit for casinos. Various forms of slot-type games have been used commercially for over one hundred years. Earlier versions of slot-type games had panels that flipped over to display symbols or had concentric circles of symbols that, if aligned in an order in a specific position (along the payline), would allow the person placing a wager in the machine to collect an award.

The more traditional video slot machine paylines of symbols aligned horizontally on the machine were actually later developed, but have become the standard in the trade. Original paylines were usually provided with 3 or five different symbols being displayed on the payline. The traditional five frame symbols developed because many early slot-type displays were based on stud or draw poker hands where five cards were provided. The use of artificial symbols on paylines (bells, cherries, sevens, plums, lemons, oranges, bars, etc.) allowed designers more freedom in payline development and simplified machines by providing three frame displays on the paylines.

Poker-style card games have been played in gaming casinos for many years. Initially, gaming casinos provided segregated card rooms in which the poker players gathered around a poker table and played whatever game was being dealt at that table. The gaming establishment provided the dealers, handled the exchange of money for gaming chips and took a rake (a percentage of each poker pot) as the fee for these services. Alternatively, instead of raking from each pot, the gaming establishment would simply charge a time based fee for providing the poker game.

This type of live poker played in legalized gaming establishments such as those in Nevada is not widely accepted by the average gaming patron. Most are afraid to play due to the reputation that professionally skilled players are lurking in the poker room, waiting for the unsuspecting player to come along. The poker-style gaming equipment has enabled players to enjoy a level of excitement in poker games without fear of professionally competition.

With the advent of computer electronics, one player poker games played on electronic gaming machines have also become quite popular. Five card draw poker was the first poker game adapted to this format and the player attempts to achieve a high ranking poker hand from his initial five card dealt hand and any draw replacement cards he desires. A payout table is provided that pays the player various multiples of his wager depending on the rank of poker hand that the player achieves.

Since the introduction of electronic video draw poker, many other variations of poker have been adapted to electronic one player gaming machines. Joker's wild poker, deuces wild poker and five and seven card stud have all been programmed for play in this style—each with its own unique payout table reflecting the relative odds of achieving various poker hand rankings in each of these games.

Slot machines generate greater than fifteen billion dollars per year in revenue for U.S. casinos, with individual machines typically earning between fifty and one hundred and fifty dollars per day. One of the fastest growing segments of slot machine play is video poker, a game in which various elements of draw poker are represented on a video display. Players draw and hold cards in an effort to attain a hand high enough to qualify for a prize or payment. Starting with "Jacks or Better," video poker quickly expanded into "Deuces Wild" and "Joker Poker" as well as countless variations of the above with different payout schedules. Players are attracted to the relatively high payouts possible for top hands such as a royal flush, as well as the frequent lower-end payouts for hands as low as a pair of jacks. Of equal import is the fact that poker symbols are universally understood in most cultures and there is appreciation of the potential for both rank, suits and order in the display of the cards. This offers potential for games that have not been fully appreciated. For example, even though the order of cards may be used in valuing payouts in poker type games, is has been common in casino to limit the dependence on payouts to a specific order of cards in poker hands to unique bonuses (e.g., awarding a jackpot or grand prize such as a car) when a Royal Flush appears in left-to-right descending order (Ace-King-Queen-Jack-Ten in suit).

Additionally, many players find that the interactive nature of the game, choosing which cards to draw, provides a more exciting game than the traditional reel-based slot machine, in which the player simply passively watches the outcome. Although popular with players, video poker has a number of disadvantages from the casino's perspective. First, game speed can be significantly slower than conventional reel machines. Players sometimes agonize over a particular play, taking their time in deciding what the correct play is. With no incentive to accelerate play, players sometimes languish over their decisions. Casinos prefer a faster-paced game since profits rise in direct proportion to the number of hands completed per hour. Additionally, the house edge associated with video poker has consistently deteriorated as casinos have begun to compete more for players. Because full payout tables are provided on the face of the machine, players can easily distinguish between high payout machines and low payout machines. Competition for video poker players has resulted in some video poker machines which pay out in excess of 100% with perfect playing strategy. Although most players are not playing perfectly, the growing availability of books and computer software is resulting in more and more sophisticated players. The slow play and declining house advantage, when combined with the significant cost of player complimentaries (comps), such as free meals and drinks, has resulted in shrinking casino profits for video poker. Consequently, there is a need to increase the house advantage without appearing to disadvantage the player.

One problem facing game manufacturers is the need to continually create new and exciting games to maintain the interest of the public. This is more difficult than it appears at first glance. Of course, to be successful, the new game must appeal to the player to generate profitable revenue. The gross revenue generated by a game is based on a variety of factors, such the length of time each player plays, the amount wagered, and the average percentage "take" of the game. If the "take" is too high, a player is generally unwilling to play. If the "take" is very low, then it is necessary to ensure that the game is played nearly continuously so that revenue is constantly being derived. When players play a game for only short periods of time, the revenue of the game is generally reduced because of "idle" time between players. The amount wagered also contributes to the revenue. In general, if the amount that a player is willing to bet, either on each game or over time can be increased, then the revenue of the game will generally increase. These and a variety of other factors all contribute to the total revenue produced by a game.

The ability of a game to generate a profit is dependent not only upon the gross revenue produced by the game, but the cost of producing and operating the game device. A game may be very appealing, but if extremely expensive to produce, its revenue may not exceed its costs. Profitability is thus tied to both the cost of the game and the ability of the game to generate revenue.

The appeal of a game and the length of time a player will play a game are dependent upon a number of factors. These factors include some of those described above, such as the odds or take, and on a variety of other factors. For example, a game which is very difficult to understand and play will not tend to draw many long-term players. A few players may take to the game, while most will be alienated and play once or twice. A game which involves little skill may appeal to a wide cross-section of the public because of its ease of play. On the other hand, the length of time a player may play such a game may be fairly short, with the player losing interest unless "luck" is on their side and they see consistent winnings during a session of play.

U.S. Pat. No. 6,517,432 describes a gaming machine comprises a visual display and a game of chance shown on the display. In connection with the game of chance, the visual display shows an array of symbols in visual association with at least one pay line. The array includes a special symbol and a stop-game symbol. The game of chance includes a plurality of game rounds. During each of the game rounds the special symbol and the stop-game symbol randomly move to and stop at new respective positions on the array. The game of chance awards a payout during the round if the symbols along the pay line correspond to a winning game outcome. The game of chance ends in response to the new respective positions on the array during one of the game rounds being the same position. The array optionally includes a second special symbol that, during certain ones of the game rounds, also moves to and stops at a new position on the array. In determining whether to award a payout, the array positions containing the special symbols are preferably evaluated as wilds.

U.S. Pat. No. 6,471,587 describes a method of playing a video wagering game that includes selecting indicia such as representations of playing cards and presenting them as a first hand and a second hand to a player. Certain hand indicia combinations are designated as winning outcomes with the remainder designated as losing outcomes. Upon viewing the first and second hands the player opts to rearrange the hands by exchanging one or more indicia between the hands attempting to obtain at least one winning outcome or to better their outcome(s) for the hands. If one or both of the hands comprises winning outcome combinations of indicia, the player is rewarded. Otherwise, the player loses.

In a preferred embodiment the indicia are representations of playing cards. The player makes a wager and two, separate, five card hands are displayed. If one of the hands has a qualifying holding of cards, e.g. a pair of 7's or better, the player is given the option to exchange cards between the two hands to increase their expected reward. For example, where the reward is based upon the ranking of hands according to the rules of Poker, the player may opt to move cards to increase the Poker ranking of one or both of the hands to increase their reward. After the player has exercised their option, the final hands are compared to a schedule of winning outcome hands and, if either or both of the hands represent winning outcomes, the player is rewarded based upon the ranking of the hands.

U.S. Pat. No. 6,261,178 describes machines of the type having multiple pay lines available, in which the player would purchase the option of playing for a win on lines other than the centre line. In order to add further player interest, the game is also provided with a random feature whereby under certain circumstances, a further combination of symbol positions, referred to as the "mystery line", will be randomly selected by the machine's controller to give the player another winning opportunity. A prize is paid to the player in the event that a predetermined combination of symbols is displayed in the randomly selected arrangement of symbol locations, "mystery line."

SUMMARY OF THE INVENTION

A reel-type display wagering game is provided in which the symbols on the frames or positions of the pay line display are capable of having an ordered or non-ordered arrangement. A very convenient set of specific or species symbols are themed images or titles that can be associated within a single theme. For example, racing themes (e.g., horse racing themes) such as owners, trainers, jockeys, runners, farms, breeds, horse names, race types, tracks, race events, wagering types (e.g., win, place, show, Daily Double, exacta, trifecta, etc.) and colors (especially farm colors or owner colors) can be used to define symbols that may be defined as winning combinations for a specific order on the display or in random order but specific combinations. It is less preferred to use poker cards or playing cards, such as the Ace, King, Queen, Jack and Ten (down to the deuce and possibly including wild cards, with a Joker being a non-limiting example thereof) value cards in the various suits being provided. Other symbols, especially generic symbols, such as days of the week (Saturday, Sunday, Monday, Tuesday, Wednesday, Thursday and Friday), Months of the year, numbers (e.g., 10,000; 1,000. 100, 10 and 1), the size of images (e.g., 20 mm, 16 mm, 12 mm, 8 mm and 4 mm) which would be readily distinguishable, colors of the rainbow (Red, Orange, Yellow, Green Blue, Indigo and Violet), distances or measurements (e.g., 1500 m, 800 m, 400 m, 200 m and 100 m), or any other symbols or values that have a recognizable or displayed order (e.g., value of cards, showing an order of Mazzerotti, Mercedes, Cadillac, Honda and Yugo) can be used. Additional symbol variations within the order should also be used, such as suits for cards, colors for other values, patterns (stripes, checks, plaids, patterns, etc.) are also desirable symbol modifiers. The generic symbols may be provided in a number of ways. The generic symbols may be provided in a separate set of reels or frames, or may be added as subtext or supertext on the same frame or reel position as the species symbols. In a preferred embodiment, one symbol content (e.g., color, shape, pattern, or first name) is provided on the symbol display areas, and then in a second element of display (either contemporaneously or preferably subsequently or overlapping in time with the display of the one [or first] symbol content), the second symbol content (e.g., a different set of symbols, words, terms, colors, shapes, patterns, etc.) is displayed. The first set of display may provide an indication of a potential level of win, and the second set of display fixes an amount (if any) of a winning event.

The first set of symbols is displayed in a first format. The player reviews the first set of symbols and may be allowed a change at a discard and replacement of symbols in the first set. For example, the play may allow replacement of only one symbol in the first display of the first set, or may be allowed replacement of one or more symbols (up to all of the symbols or all but one of the symbols, at the election of the player. The draw of the suit, independent from the draw of the second symbol may be played even in a separate game event, without the necessity of the underlying rules of the basic game described above. For example, in a standard video poker game format with five symbols, the suits may be first provided, and the player may elect to discard one or more of the suits, and then after the suit replacement, cards may be dealt to provide the rank symbols, which in turn may then be discarded (either by rank only or by rank and suit).

The apparatus displays the symbols along a payline (the position of the symbols being randomly generated by any of the systems or programs, algorithms or templates known in the art to control symbol display in a manner that enables payouts to be controlled or predetermined over time) and awards are provided for the display of symbols which includes at least a multiplicity of payouts that considers both a first display content and then a second display content (eventually simultaneously shown on the video screen) either in order, in defined combinations and possibly with symbol modifiers (e.g., multipliers).

BRIEF DESCRIPTION OF THE FIGURES

FIGS. 2 *a*)-*e*) shows a series of frame displays within which the symbols of the game(s) may be displayed.

FIG. 3 shows a paytable for the “Royal Spoil™” version of a game according to the practice of the present invention.

FIG. 6 shows a table compilation of all possible reel combinations.

FIG. 12 shows a screen shot of a paytable and display of three symbol areas for use in a version of a second alternative of the described game called “Triple Crown™” video game.

FIG. 7AA shows a paytable for the first indicator and second indicator combinations.

FIG. 7AB shows a paytable of events that achieves class multipliers.

FIG. 7BC shows the color pays combinations.

FIG. 7CA shows the paytable for Stakes events.

FIG. 7DA shows the paytable for Tote events.

FIG. 7EA shows the paytable for Exotics events.

FIG. 8AA shows the paytable schedule for Scratched or Elimination Rules.

FIG. 9AA shows one possible mapping format for the probabilities of the Outer Card Deck.

FIG. 10AA shows a paytable with the Make-Up of Winning Combinations.

DETAILED DESCRIPTION OF THE INVENTION

Figure 1:
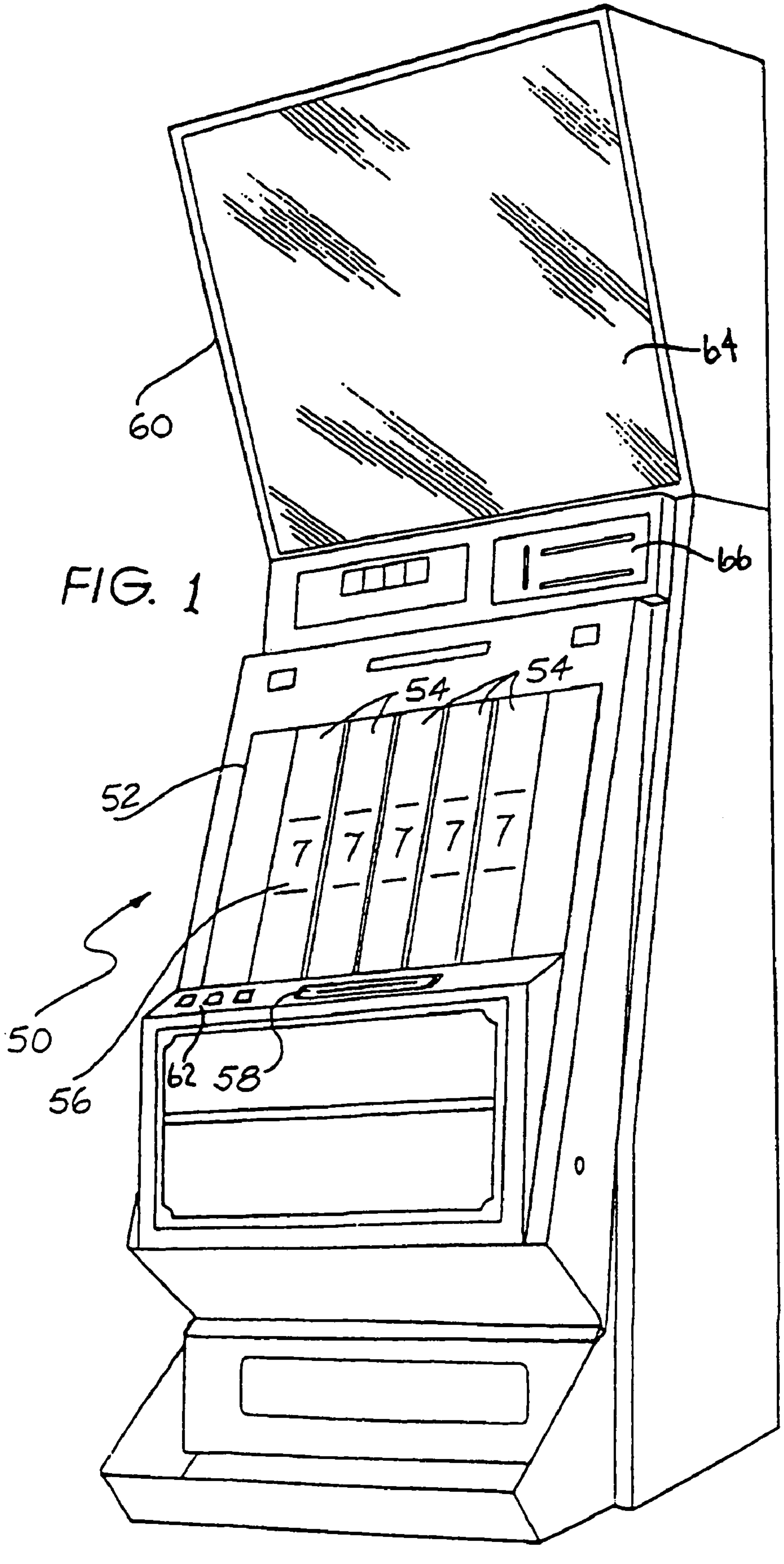
FIG. 1 shows a video gaming apparatus on which the games of the invention may be displayed.

One format of a game of the present disclosure is most conveniently described with reference to the use of playing card symbols and on video gaming equipment, but the description, as noted above, applies to any symbols in which an order may be apparent or defined in the play of the game, and may also be played on mechanical reel machines also. The game may be played with 3, 4, 5 6 or more frames displayed on each payline, although the use of 5 or 6 frames per payline is preferred. Any format of symbol display controls such as random number generators, pure statistical mapping, template mapping (as in CA 2,357,130) or other reel mapping systems (e.g., U.S. Pat. No. 4,448,419). Processing controllers may be individually hardwired systems, PC-based, MAC-based, and may operate with any available operating system (e.g., WORD, LINUX, etc.) and with any system having sufficient functionality to support the implementation of the games of the invention. These games may be played at a casino, on-line, or as video games with score counts maintained.

In addition to a generic play of the game in which specific rules define the provision and replacement of both symbols and ranks together, which is described in detail in the section below titled "Suit and Rank Format," there is another generic format of play that can be performed separate from the Suit and Rank Format, and is called the "Double Draw" format, which is described as follows:

Double Draw Format

In the play of the Double Draw format, the generic symbol (e.g., suit) is separately provided from the specific symbol (e.g., rank) in a first portion of the spin or symbol delivery after the wager. The first set of symbols is displayed in a first format, which may be separate frames for the suit symbols, or the corners of a frame where both suit and rank will be ultimately displayed, as in standard playing card symbols. The player reviews the first set of symbols that are delivered and may be allowed a change at a discard and replacement of symbols in the first set. The system may be set up so that awards achieved with no generic symbol replacement (e.g., no suit replacement) will be higher than awards provided when one or more generic symbols are replaced. The amount of the award may vary with the number of generic symbols replaced, such as 100% award with no generic symbol replacement, 90% with one generic symbol replacement, 80% with two generic symbol replacements, 75% with three generic symbol replacements, and 70% with four generic symbol replacements. Separate paytables may therefore be displayed and internally provided on the memory and executed by the software as the game is played.

In an additional example, the play may allow replacement of only one symbol in the first display of the first set, or may be allowed replacement of one or more symbols (up to all of the symbols or all but one of the symbols, at the election of the player). As noted, the payout rates may remain the same or vary as the game is to be played, at the election of the programmer, the casino, or even the player, electing among play and rule formats on the machine.

The draw of the suit (an example of the generic symbol) is independent of the draw of the second, specific (e.g., rank, 2, 3, 4, 5, 6, 7, 8, 9, 10, J, Q, K and Ace) symbol and may be played even in a separate game step, without the necessity of the underlying rules of the basic game described below. For example, in a standard video poker game format with five symbols, the suits may be first provided, and the player may elect to discard one or more of the suit symbols, and then after or during the suit symbol replacement, cards may be dealt to provide the rank symbols, which in turn may then be discarded (either by rank only or by rank and suit).

This last element is also unique, where after receiving replacement generic suit symbols, and then receiving the specific rank symbols, the player may have various format options of further discard and replacement. For example, the rule format may allow for only the rank symbols to be replaced on the second draw, or may allow for the entire combination of suit and rank symbols to be replaced, thus enabling a suit symbol to be discarded twice in the same round of play, but only in combination with the discard of the rank in the second discard and replacement.

Examples of the play in this format are shown below. The examples will again use poker suits and ranks for convenience, but as described elsewhere, the generic and specific symbols may be selected by the designer without ltering the underlying features of the disclosed technology. Additionally, although the play is described with a 5-frame game, it may be varied to be played with a 3-frame game (e.g., a 3-Card Poker® game variant, a 4-card frame (e.g., a 4-card poker variant), 5-frames, 6-frames or seven frames in a line.

First Generic Symbols Provided—5 Frame Play

Generic symbols are ♥, ♠, ♣and ♦

| | | | | |
|---|---|---|---|---|
| ♠ | ♥ | ♥ | ♣ | ♥ |

The player examining this display would possibly elect to discard the first and fourth symbols. The method provided to perform the suit draw is called "Suit Smart", a button function with the four suit symbols of spades, hearts, diamonds and clubs on it or them, that when the chosen suit symbol is pressed the automatic hold of that suit is engaged leaving the displayed generic symbols as:

| | | |
|---|---|---|
| ♥ | ♥ | ♥ |

After replacement, the symbols may look like the following:

A

| | | | | |
|---|---|---|---|---|
| ♠ | ♥ | ♥ | ♥ | ♥ |

or

B

| | | | | |
|---|---|---|---|---|
| ♥ | ♥ | ♥ | ♥ | ♥ |

It is desirable to allow the player to see the entire draw of the generic symbols separate from the rank symbols to build up expectations of a win. However, one additional variant would be that coincident with the replacement of the generic symbols, the rank symbols are provided Thus, in the replacement shown above, the replacements could appear as:

A'

| | | | | |
|---|---|---|---|---|
| 7♠ | 8♥ | 9♥ | 10♥ | 6♥ |

Which provides a straight as the initial rank or

B'

| | | | | |
|---|---|---|---|---|
| 7♥ | 8♥ | 9♥ | 10♥ | 2♥ |

which provides a flush as the initial rank, or

A"

| | | | | |
|---|---|---|---|---|
| 2♠ | 8♥ | 9♥ | 10♥ | J♥ |

which provides an initial hand of Jack high, but with significant draw potential.

With hand A', the player may elect to stand with the straight where the paytable can also provide an increase on the final return for being 4 suited, or discard the seven of spades to seek a straight flush or flush. This event would provide a set of symbols before the replacement of the following potential sets, depending upon rule variations:

A'

| | | | |
|---|---|---|---|
| 8♥ | 9♥ | 10♥ | 6♥ |

where the symbols of both suit and rank can or must be discarded;

A'

| | | | | |
|---|---|---|---|---|
| ♠ | 8♥ | 9♥ | 10♥ | 6♥ |

where the rank only can be discarded; or

A'

| | | | | |
|---|---|---|---|---|
| 7 | 8♥ | 9♥ | 10♥ | 6♥ |

where the suit only can be discarded, even in the second draw.

With hand B', the player may stand with the flush, but if the play option allows for replacement of the rank symbol only, the player would elect to discard the rank of 2, seeking a straight flush if a 6 or Jack is provided, as follows, first discarding rank to provide:

B'

| | | | | |
|---|---|---|---|---|
| 7♥ | 8♥ | 9♥ | 10♥ | ♥ |

and then taking a rank replacement value to achieve:

B'

| | | | | |
|---|---|---|---|---|
| 7♥ | 8♥ | 9♥ | 10♥ | 6♥ |

with the A" hand, the possible sets of symbols after the second discard, after the first replacement and before (or with the contemporaneous) second replacement could be:

A"(1)

| | | | |
|---|---|---|---|
| 8♥ | 9♥ | 10♥ | J♥ |

A"(2)

| | | | | |
|---|---|---|---|---|
| ♠ | 8♥ | 9♥ | 10♥ | J♥ |

A"(3)

| | | | | |
|---|---|---|---|---|
| 2 | 8♥ | 9♥ | 10♥ | J♥ |

and upon completion of the second replacement, the hands could appear as:

A"(1)

| | | | | |
|---|---|---|---|---|
| 3♣ | 8♥ | 9♥ | 10♥ | J♥ |

for a Jack high, non-paid hand;

A"(2)

| | | | | |
|---|---|---|---|---|
| 7♠ | 8♥ | 9♥ | 10♥ | J♥ |

for a Jack high straight, which might be a paid hand and might provide a paytable that can also provide a better return for the straight due to it being 4 suited; and

A"(3)

| | | | | |
|---|---|---|---|---|
| 2♣ | 8♥ | 9♥ | 10♥ | J♥ |

for a Jack high, non-paid hand.

This game has been exemplified for the play of traditional five-card draw poker events, but may be played with accommodations in then play of 3-Card Poker® games (Shuffle Master, Inc.), 4-Card Poker, 6-card poker and 7-card poker, merely by changing the numbers of frames and symbols received and providing different pay tables. The game may be adapted to variants including Texas Hold'Em poker and Omaha Poker, for example as follows.

The player is dealt 2 suit symbols for cards (Texas Hold'Em Poker) or four suit symbols for cards (Omaha Poker) and makes the first election, before seeing the flop. After discard of suit symbols, any discarded symbols are replaced and the ranks are provided, similar to the format described above. After receiving the replacement first symbols (e.g., the suits), the second symbols are provided, e.g., the rank. These second symbols are again replaced with discards controlled by the player, before the flop is shown, with the three available options described above of discarding only the suit, only the rank or the suit and the rank being determined by the rules.

As the system is being played on an electronic processing system, another significant variant for all of the games and options being played is the consideration of whether a single or multiple decks of virtual cards is to be provided, whether a single deck will be used for all of the cards, whether a single virtual deck or multiple virtual deck will be used for each card and the like. For example, the use of a single deck for the entire five frames in the exemplary game allows the players to determine the probabilities of events better in making selections, while the provision of a single deck to each frame allows easy probability evaluation and allows for unique hands such as 5 Aces of spades, and unique paytables.

Suit and Rank Format

The underlying play of the game is the provision of viewable (player viewable) paylines on a screen. The paylines may be horizontal, vertical, diagonal, non-linear, circular, or the like, but should be capable of being read in an order (e.g., the frames should be discernible as first frame, second frame, third frame, fourth frame, fifth frame, etc.) in a payline. The symbols within the frames are altered after a wager is placed in the machine. The alteration may be by spinning of reels, virtual spinning of virtual reels, spinning of individual frames, morphing of paylines or individual frames, flash replacement (complete image replacement) within paylines or frames, or any other method by which images within paylines and reels may be changed. As noted, the symbols should be recognizable and/or defined in the rules and play of the game as having an order, which is an organizational or ranked relations among all of the symbols. In mathematical terms, for ordered symbols, A>B>C>D>E defines symbol order such that an appearance of AB is an ordered array, but BD is not an ordered array because of the absence of C from the order between B and D. In the non-limiting example of poker hands, with a five or six reel game, the order would be Ace>King>Queen>Jack>Ten (optionally)>Nine. The symbols are displayed in the frames displayed on the screen (or by mechanical reels) and the distribution of symbols is evaluated to determine if the display provides winning arrangements of symbols. In addition to the rank of the order, symbol modifying effects are also desirable or required to provide an optimal game. With the use of poker/playing card symbols, suits are the most appropriate symbol modifiers. With other symbols, colorations, decoration, size, height, animation, values, or the like may be used to be the symbol modifiers. For example, where days of the week are used as the symbols, colors such as Red, Blue, Yellow and Green may be used to modify the symbol to provide subsets or arrangements. Similarly if cars, planes, trains, boats or other vehicles are used as the rank of the symbols, colors or years (1920, 1940, 1960, 1980 and 2000) may be used to modify the underlying symbols. As noted earlier, the poker symbols and suits shall be used in the detailed descriptions, but the practice of the invention is not to be interpreted as limited thereto.

FIG. 1 shows a general gaming cabinet 50 with such standard components as the game display panel 52 having five columns 54 and a major payline row 56. A currency slot 58 and card slots 66 (for credit cards, player cards, printed slip insertion/emission) provided. Player control buttons 62 are shown although the display panel 52 may also have touch screen functionality. The gaming cabinet 50 usually has a fixed, inactive, or active non-game display panel 64 on which advertising, game rules, payout tables, animated awards or service notices etc. may be provided.

Figure 2A:
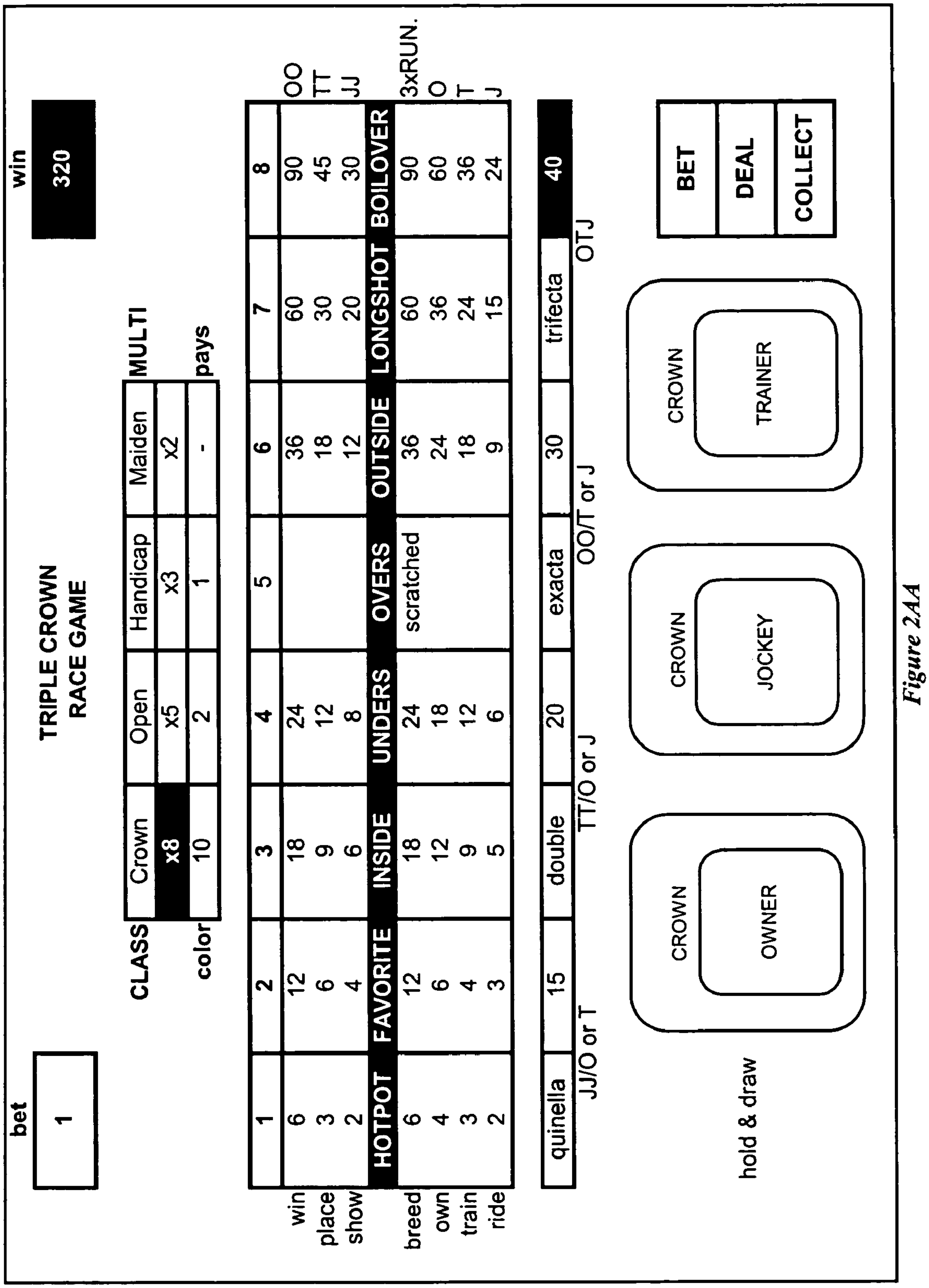
FIG. 2AA shows a screen shot of a game referred to as Triple Crown video game in which a multiplier is achieved from the first indicator, multiplying the win achieved from the second indicators with an Owner, a Jockey and a Trainer.

FIGS. 2A, 2B, 2C, 2D and 2E show a first set payline (100) of frames 102, 104, 106, 108 and 110 in which symbols and symbol modifiers are displayed. In FIG. 2A, a Royal Flush with progression of rank from highest to lowest, left-to-right in spades is shown on the payline. This order of suit and rank would have a distinct payout rate shown on a paytable. In FIG. 2B, a Royal Flush with progression of rank from highest to lowest, right-to-left in spades is shown on the payline. This order of suit and rank would have a distinct payout rate shown on a paytable.

FIG. 2C shows a set of symbols with an ACE of spades in the first square. This may be a symbol that is provided with an award in a paytable, but the other symbols (including the pair of Jacks) may or may not contribute to the award. An objective of the symbol display game is to provide an order to the symbols and possibly a suborder (symbol modifier) in conjunction with the symbols. Although awards may be provided for non-ordered displays (e.g., four-of-a-kind in frames 104, 106, 108 and 110), an underlying element of the game is the award of the ordered display of symbols and possibly symbol modifiers.

FIG. 2D shows a payline symbol display set wherein the first two frames are KING of hearts and ACE of hearts. This order (from left-to-right) is ascending rather then descending, but is provided in the pay table as a payout arrangement of ordered symbols, as is the ascending Royal Flush of FIG. 2A. The order, however, does have to begin with the first left hand frame in the preferred practice of the invention. With additional wagers and the election of additional paylines, order from other positions (e.g., right-to-left, diagonal, non-linear, etc.) may also be provided in the play of the game.

FIG. 2E shows a symbol display that has no ordered payout set on the payline. This flush may be paid on occurrence of the flush on any single payline wager.

FIG. 3 shows a possible paytable for play of one embodiment of the symbol order/sub symbol order game of the present invention. These payout rates are illustrative and may be varied for many reasons, such as higher player payouts, higher house retention, promotional events, changes in game rules, addition of bonus events, addition of jackpots or super jackpots, addition of progressive events, addition of further paid events, and the like.

One specific method of playing a game according to the present generic invention would include, for example, a player placing a wager on a gaming apparatus, the apparatus displaying paylines with symbols thereon after placing of the wager, the apparatus determining winning events in the paylines based at least in part on:

the appearance of at least a set of symbols in a specific order, where there are at least two different sets of specific orders in which symbols must appear for there to be an award; and optionally, the set of symbols may consist of a set of symbols that is equal to the total number of frames in a payline (e.g., five frames and only A-K-Q-J-10's are available).

This description differentiates from conventional poker-type games in which the order of a Royal Flush may provide an increased bonus in the game, as that is only a single set of symbols in a specific order wherein the symbols and the order provide a different payout. The sub-symbols in the ordered Royal Flush have no effect, and the Royal Flush is defined itself as the single set of symbols. This contrasts significantly from the underlying order of play in the present game where not only is A-K-Q-J-10 in suit and order a payout set of symbols, but also other specifically ordered sets of symbols such as 10-J-Q-K-A (in suit or possibly out of suit as a straight set of symbols rather then Royal Flush), A-K-Q-J in suit, A-K-Q in suit, A-K in suit, any ACE with any K-Q or any like-suited (between the K and Q) King and Queen, and K-A in suit are other available payline arrangements of symbols. It is also possible to have the order be on an internal set of the frames (e.g., given five frames numbered left-to-right as frames 1, 2, 3, 4 and 5, the order may be allowed to appear in frames 2, 3 and 4 for example. This type of internal order is usually avoided solely for aesthetic purposes in the reading of winning paylines, except where scatter pays are used.

It is possible to incorporate elements of other known gaming plays and systems into the practice of the present invention. For example, multiline games and draw multiline games are possible and can be accommodated to the practice of the present invention. For example, with 2, 3, 4, 5 10, 15, 20, 25 etc. separate or arrayed rows or paylines available, a first payline may be presented after the initial wager, and the player elects to hold or discard various symbols. On each other payline or row on which a player has placed a wager, the retained (or not discarded) symbols will remain, and upon activation, all of the other symbols will be filled independently on each payline or row. In this way, multiple related plays of the same game will be provided.

The occurrence of certain ranked hands or predetermined event may trigger bonus events (for adding fixed amounts, multiplying wagers, multiplying winnings or otherwise enhancing the award or a payout to a player. The predetermined event could even be a non-award paying collection of symbols, such as four-of-a-kind in the same suit, five-of-a-kind in one or more suits, and the like. The bonus event may be free spins (at a fixed wager amount, such as the last wagered amount or the maximum or minimum wager amount) or may be a game event completely unrelated to the play of the underlying game. Those of ordinary skill in the art are aware of the many available bonus events such as wheel games (e.g., Bally's Monte Carlo game; IGT's Wheel of Fortune), pachinko-type bonus displays, pick until you match bonuses, picking hidden awards until and end-bonus feature is selected, picking hidden bonus amounts until the number of awarded picks has expired, games that select multipliers for wins or wagers, and the like.

The game may be played in a number of different formats, some of which have already been described an alluded to in the above descriptions. One method of play of the present invention would comprise two distinct sets of image or symbol providing display areas, such as reels, frames or panels, for example, provided as two sets of aligned five (5) frame paylines. The frames or panels may be provided by physical wheels or reels or by virtual reels or wheels on a video screen. The frames and paylines are referred to as aligned because the displays on a first one set of frames (e.g., the higher line of five reels) may be used for one set of symbol displays (e.g., the generic symbol displays, such as the playing card suits), and the lower set of frames has each frame of the second set correspond with an association (e.g., directly physically under or directly physically above) to each respective frame in the first one set of frames and displays the species symbol (e.g., the playing card rank, here preferably limited to Ace, King, Queen, Jack and Ten, and optionally Nine or lower or a Wild card).

The symbols may be displayed in the frames in many different formats. A preferred format is for one of the lines to be completely displayed (e.g., the topmost line of frames, e.g., the generic symbols or the species symbols) to be displayed first and then the other line of symbols (e.g., the lowermost set of frames with the species symbols) to be displayed. By providing the complete display of one line of symbols, the potential award of a large payout can be anticipated by a player. For example, if the display on the first line of frames is ♠♠♠♠♠, the player will anxiously await the display of symbols, knowing that at least a flush has been achieved, and possibly the Royal Spoil™ straight flush in descending order may be shown. Similarly, if the species symbols were shown first, a combination of A, K, Q, J, 10 will be eagerly anticipated for display of the generic symbols of spades, hearts, diamonds and clubs.

The generic symbols and the species symbols may be initially displayed within their own frames and frame lines one at a time, in sequence or randomly within the lines or may be displayed at the same time, within lines or among the two lines. It is preferred that one line at a time be displayed (e.g., the generic line, of spades, hearts, diamonds and clubs) and that one frame at a time be displayed, typically from left to right or right to left along the line. The sequence of displays enhances player anticipation and enjoyment.

Figure 4:
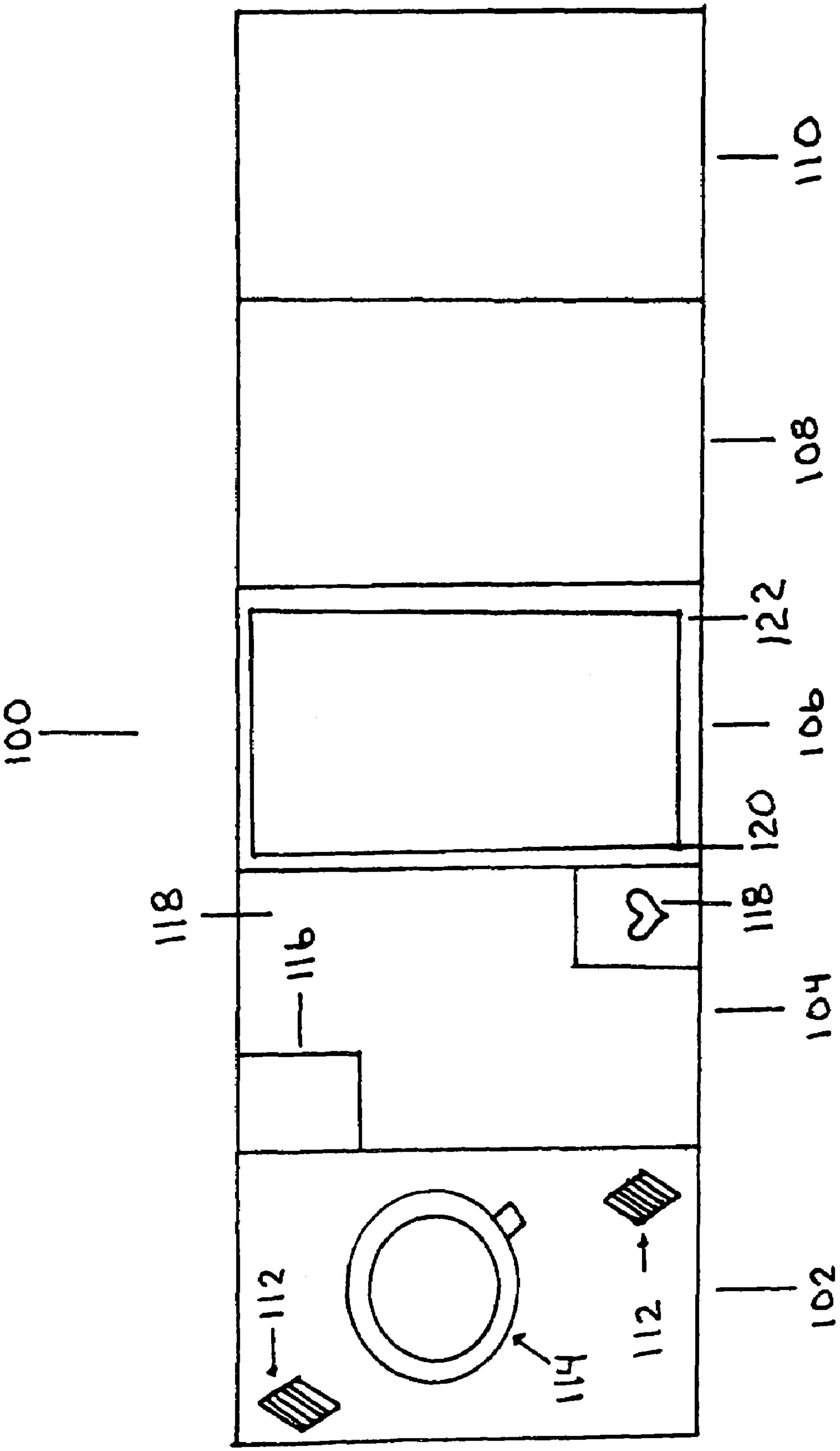
FIG. 4 shows a displayed reel frame with a generic symbol subtext and a species symbol text.

Rather than having two distinct sets of five frame lines, it is also possible to provide a single payline, which may have large graphics thereon because of the space allowed by having only a single line rather then two lines. The single line of frames 100, as shown in FIG. 4, has five individual frames 102, 104, 106, 108 and 110 for display of distinct symbols. A set of symbols is shown in only frame 102 for purposes of illustration in FIG. 4. Frame 102 is shown with the generic symbols 112 (diamonds) and the species symbol 114 (Queen). The generic symbols 112 may be easily provided in a video display module by provision of the randomly selected symbol in the appropriate location within the frame 102. Similarly, the species symbol 114 will be displayed, upon random selection, in the appropriate location within the frame 102. In a mechanical reel display, either the region 116 (as shown in frame 104) is transparent or is a hole in the mechanical reel 118, or the entire mechanical reels surface can be transparent with opaque indicia (e.g., 118) printed or painted onto the reel 118 in the appropriate areas. The transparent reel surface will allow an independent reel e.g., 120 in frame 106) to turn underneath a top reel 122 and thereby display the generic symbol(s) and the specie symbol(s) within a single frame. The symbols may or may not be order dependent for awards. A preferred embodiment uses order dependence as described herein, or where awards may be based on either order dependence or no order dependence.

Figure 5:
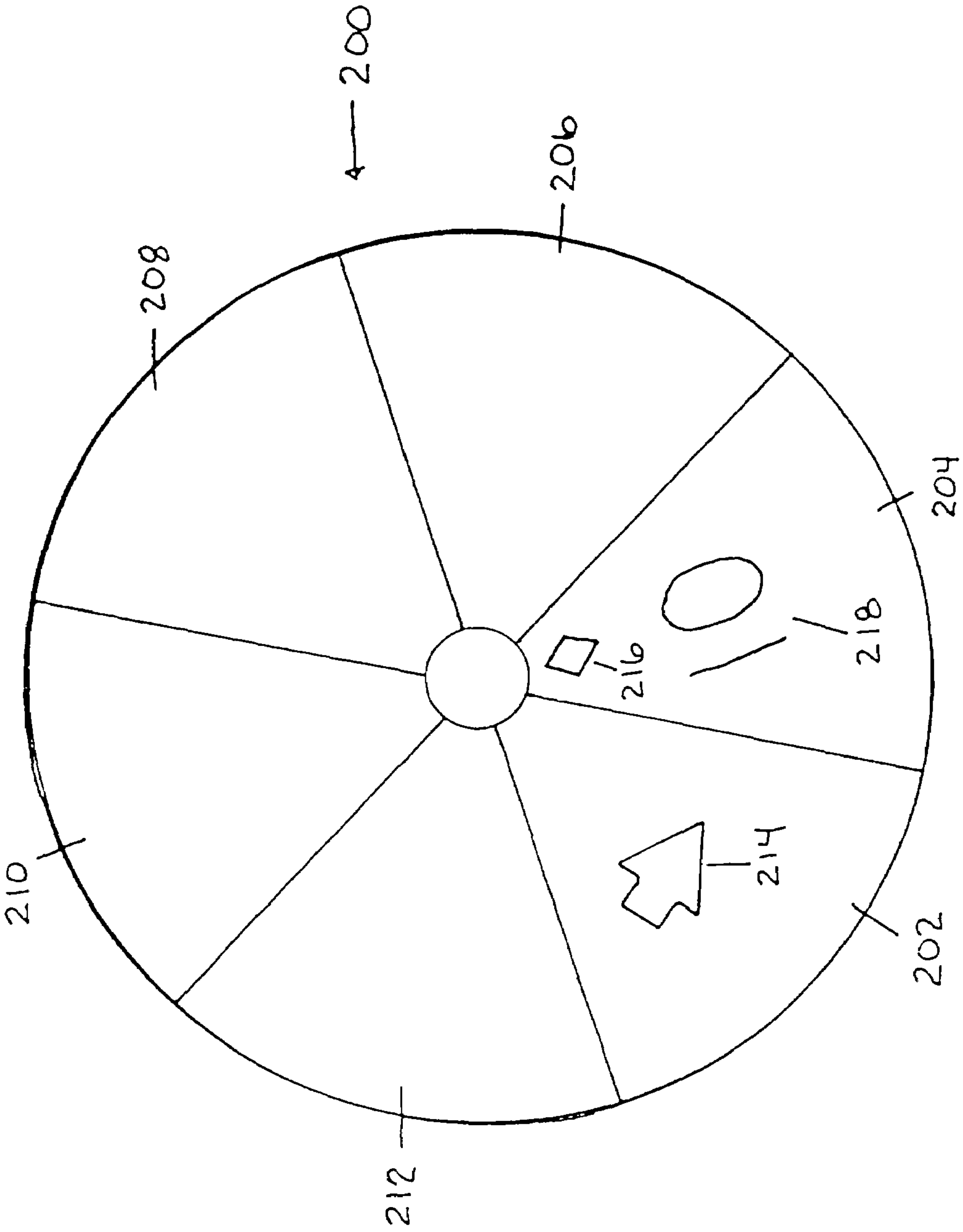
FIG. 5 shows an alternative wheel-type reel display.

It is also possible to have displays with other then row and column orientation of the symbols. For example, in FIG. 5 is shown a Wheel display format 20 for the game of the invention. Shown on the wheel format 200 are six frames 202, 204, 206, 208, 210, and 212. Five frames may be shown, but where a five symbol alignment is desired and order is important, the sixth or first frame 202 provides an orientation symbol 214 that shows the beginning of the order, starting in frame 204. Again, the symbols 216 and 218 may be shown on separate (e.g., concentric) spinning circles or may be shown in virtual display on a display surface such as CRT, LED, LCD, plasma screen or the like. The symbols (both generic and species) may be shown in the various orders provided (one at a time, all at once, sequentially clockwise or counterclockwise, randomly, etc.) as with the column and row frame design described above.

The following information explains in some further detail objectives and payout considerations in a preferred practice of the invention where there are two five frame rows associated with each other. To win a top award the 5 top reels in "Royal Spoil™" must first be flushed in one of the suit symbols (e.g., H.H.H.H.H.). The next step is to provide the species symbols (e.g., the rank). To win the highest possible payout, the Ace symbol must be located on the bottom set of frame directly below the left-most Heart (or right-most Heart) symbol, followed by King, Queen, Jack and Ten The five frames in each line (the upper generic symbol line, now discussed as having the H, H, H, H, H orientation) and the lower species symbol line. For purposes of discussion, it will be assumed that the new frames on the species symbol line have being rearranged in the 5 positions, which occurs after each event, where selecting the Ace followed by the K:Q.J.10 in that order, to collect the top award. In the event of 5 flushed reels (the five hearts or five spades, etc. in the generic reels) the player has already received the Reel-flush 1 award. If unable to locate the ace on their first selection they will be reduced to playing for a lesser reward (e.g., 1$^{st}$ selection King, 2$^{nd}$ selection Ace). If this occurs, the player has achieved K, A on the pay table, and their theoretic options at this stage of the process are, select the Queen (K.A.Q) and move up the pay table, and then possibly select (be randomly assigned) the Jack (K, A, Q, J) to get an even higher award. If the Jack appeared on the third selection after K.A, then the player must select the Queen (K.A.J.Q) next, in order to claim the higher award or be reduced to the K.A prize. The selection of the 10 will spoil ("SPOILER") the potential limits of advancement and the alternative number of ways to advance up the pay table and if the 10 was selected first, the player will have to then select a J.Q.K.A. in that order to collect an award. The selection of any symbol cannot spoil the potential for some award on the first species pick when the reels are flushed.

In the event of flushing only the first 4 reels from left to right or right to left (e.g., H.H.H.H.C. or C.H.H.H.H.), the player must select A.K.Q.J. in that order to collect the highest possible award, followed by an A.K.Q. in any order and so on down the pay table. Note: the player has received the Reel-Flush 2 award already. In the event of flushing only the first 3 reels from left to right or right to left (e.g., H.H.H.C.S. or S.C.H.H.H.), the best award potentially offered here is the selection of A.K.Q. in that order followed by A.K.Q. (e.g., K.A.Q.) in any order and so on. Also note that the player will receive the Reel-Flush 3 award only if the generic suit symbol on the last reel (to the right when playing from the left), or the first reel (to the left when playing from the right), is a red one (H or D). Flushing the first 2 reels from left to right or right to left (e.g., H.H.C.S.D. or D.S.C.H.H.) reduces the player to playing for the bottom 3 awards on the pay table by first selecting the A.K. in that order or, reversed order K.A., or selecting the Ace first only (e.g., A.Q.). A non flush results in one selection only which must be the Ace to collect an award. Another speed factor in "Royal Spoil™" is the 'Spoiler', which terminates play immediately and pays any entitlement at that point. 'Spoiler' means selecting a ranked species symbol that stops the advancement up the pay table, or ends the game without reward, e.g., The generic symbols H.H.H.H.H. appear and the player can attempt the top award as they are entitled to 5 selections. The first selection is the 'ACE' ('A.' receives an award), secondly the 'KING' ('A.K.' increases the award), thirdly the 'JACK' (A.K.J. 'spoiled' the chances of collecting the top award A.K.Q.J.10). The player now has 2 selections left (Q and a 10). Select the 'QUEEN' (A.K.J.Q) next and increase the award (A.K.Q.J in any order), or select the 10(A.K.J.10) and 'SPOIL' any further advancement up the paytable and pay out on A.K. Another example is when the generic symbols read H.D.C.S.D (a non-flush reel), the player is entitled to 1 selection only, which must be an 'ACE' to collect the award. The selection of either a King, Queen, Jack or Ten first would result in the attempt to locate the 'Ace' as that of being termed 'SPOILED'. The term 'SPOILER' relates to the characterization of the game-over content employed in the game 'Royal Spoil' and other variations, designed to tempt and congratulate play. Another function is indicators (see screen design), which help the player by flashing and highlighting the ranked symbols required to collect an award, eliminating each flash as the symbols are selected and indicating to the player to continue play. This will help to keep the game moving also.

The 5 Reels on the top are preferably the suit symbols only, which indicate to the player what suit they're playing in and how many reels from left to right or right to left are flushed (coupled with flashing indicators above the reels), if any. The A, K, Q, J, 10, ranked species symbols appear on the bottom or shuffled component, and depending upon what the reels reveal by way of suit or consecutive suit symbols, reveals how many possible selections and awards a player is entitled to play for. These 5 positions are rearranged after every event and there is 120 ways in which they could be positioned (see The Shuffle in FIGS. 3 and 6).

It is also possible to use blank spaces in the frame displays, but that is not necessary to practice of the invention. A wild card or Joker may be added as a wild card variation "Wild Royal Spoil™" and as a special symbol in the variation "Joker Spoiler™". These 2 games would require the bottom or shuffled component of the device to provide 6 potential positions as the joker will be added to the ranked species symbols and the suit rank would be immaterial to a Joker display. The paytables would be adjusted for use of a game with a Joker present.

A.K.Q.J.10.Jkr. (or alternatively in a five frame game A, K, Jkr, J, 10), these 6 positions are rearranged after every event and there are now 720 ways in which hands can be formed. The 5 reels and suit symbols on the top remain the same.

The reel flush awards are clearly shown in FIG. 6, whereby an award is guaranteed after a spin of the generic symbol line, and the guaranteed award can only be increased or remain the same in the spin of the second line of species symbols. That table also shows the Reel-Flush 2 (4 consecutive suit symbols from L-R or R-L) and the Reel-Flush 3 (3 consecutive suit symbols from L-R or R-L) awards on the pay table of FIG. 6. The Percent Pay Back or Return to Player (RTP) configurations where the $1^{st}$ returns 94.34%, the $2^{nd}$ 94.3% and the $3^{rd}$ 103.21%. The $1^{st}$ and $2^{nd}$ RTP's are always on offer but the $3^{rd}$ one comes into play when a red suit symbol (H or D) appears on the $5^{th}$ and last reel to the left or right, depending on which way the reels are being read, which is in this scenario, 40% of the time.

The overall average house % (Take) is 97.36%. Note: The pay tables can be easily manipulated to reflect bigger or smaller returns to the house. The paytables of FIGS. 3 and 6 are demonstrations to reveal the method of ratios used in 'RS' to balance the negative expectations against the positive expectations. The Reel-Flush awards are the payouts awarded on the first predetermined ordered set (Reels). The incentive to increase a wager is in the fact that awards are doubled and tripled, but, a max coin bonus or any other type of jackpot system can be added.

The structure of the reels is concealed, as in any reel device is, giving the house the advantage but the shuffled or rearranged component is revealed by the fact that there is only 5 symbols (A.K.Q.J.10) under the 5 available positions giving the advantage to the player. 'ROYAL SPOIL' is a game designed around the combination of a reel-type device coupled with the shuffle-type device (reel-shuffle) where the outcome is 60% negative expectation and 40% positive expectation. This method provides a mechanism that creates the necessary house advantage, while providing the player a 40% positive playing field, allowing for the potential to create strategies which consequently involve increasing wagering.

Figure 7A:
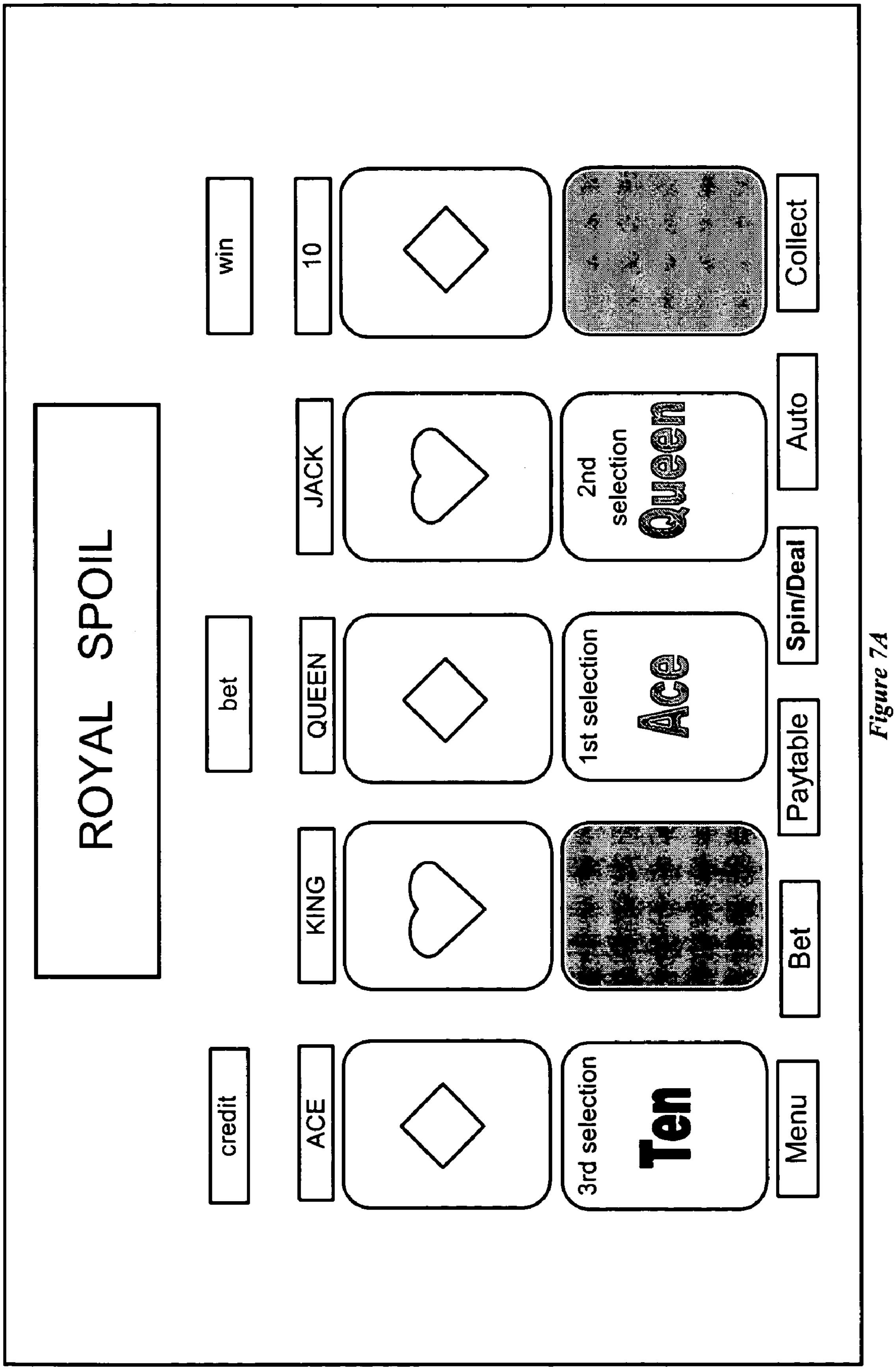
FIG. 7A shows a screen shot of the basic Roil Spoil™ game.
Figure 7B:
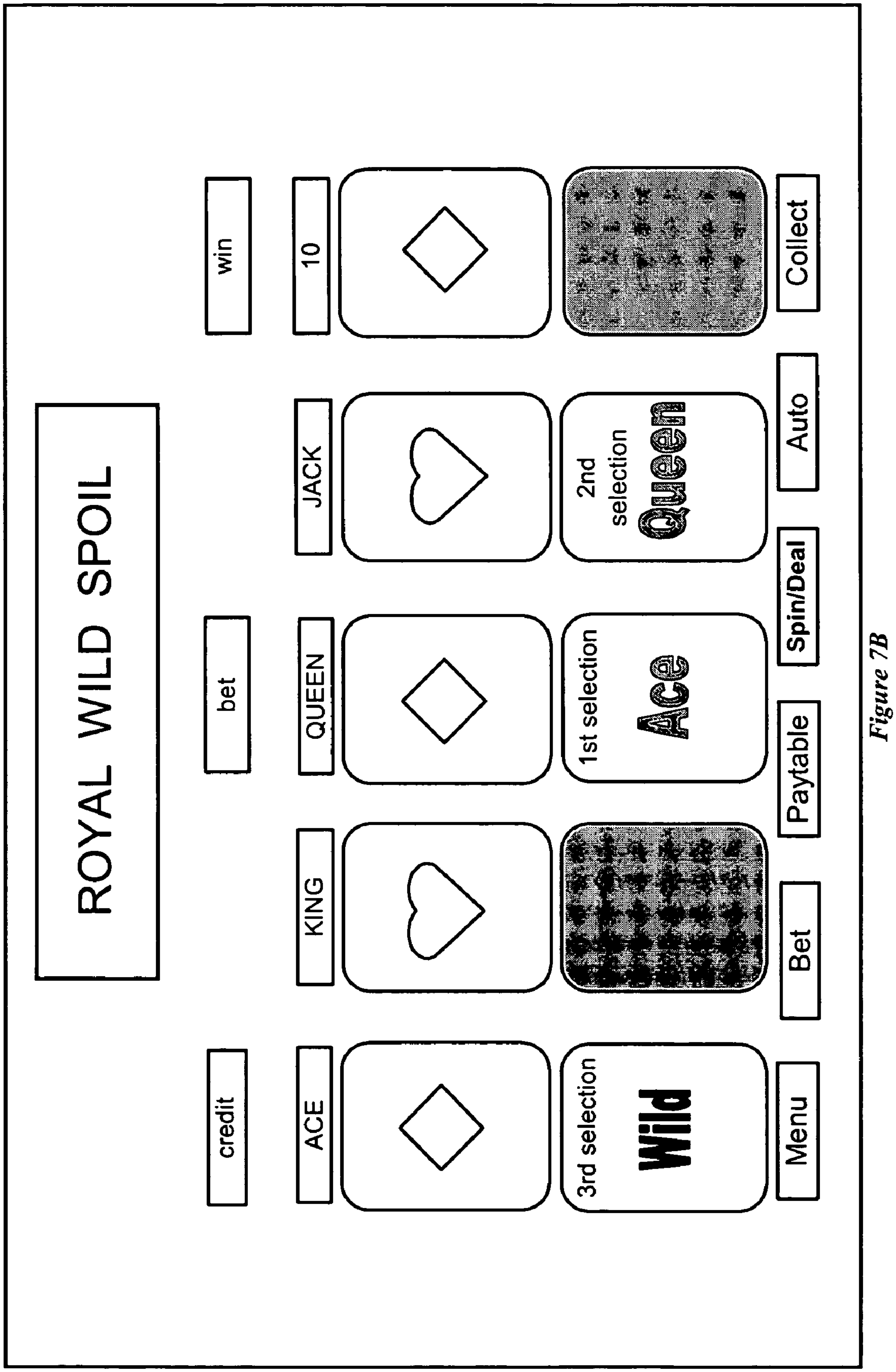
FIG. 7B shows a screen shot of the Royal Wild Spoil™ game.
Figure 7C:
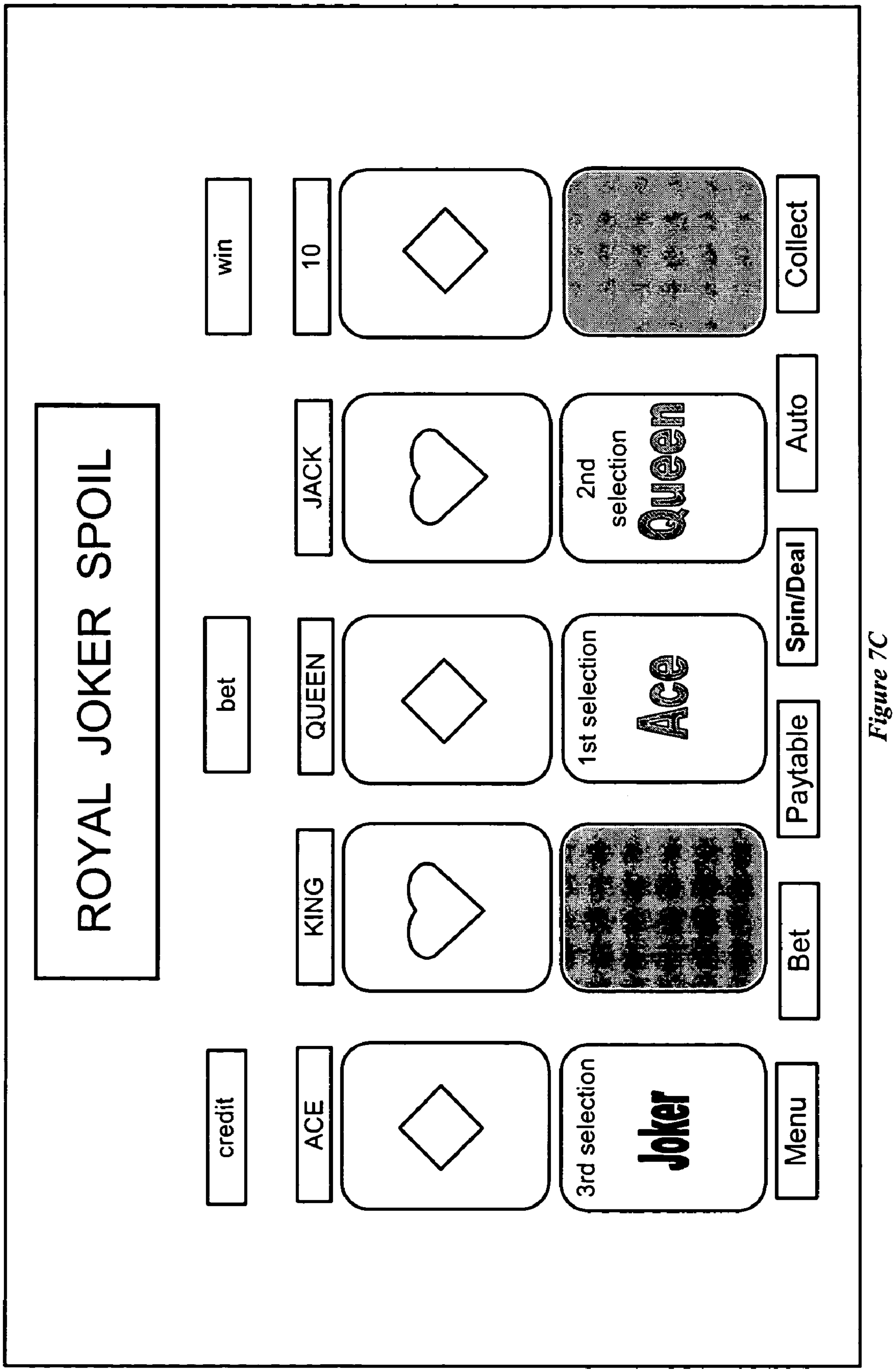
FIG. 7C shows a screen shot of the Royal Joker Spoil™ game.

FIG. 7A shows a screen shot of the basic Roil Spoil™ game. FIG. 7B shows a screen shot of the Royal Wild Spoil™ game. FIG. 7C shows a screen shot of the Royal Joker Spoil™ game. These screen shots show variations on the play of the games within the generic scope of the invention. Note that with the same generic suiting (diamond, diamond, diamond spade and heart) that there is a range of payouts available and even differences in payouts with the Royal Wild Spoil™ game and the Royal Joker Spoil™ games even with the same cards (with the joker SPOIL replacing the joker Wild).

The format of the present game is also amenable to bonus play. Bonuses may be awarded for any special predetermined reel event, such as a Royal Flush, Five-of-a-Kind, Five-of-a-Kind with a predetermined number of the cards (e.g., at least 3, 4 or 5 cards) in the same suit, and the like. Bonuses can be awarded with separate paytables on the same reel displays or additional display symbols added, or awarded free spins (at a predetermined effective credit input, such as at the amount of the last wager or at the highest amount allowed to be wagers, automatically). For example, specially suited cards ranks (such as a "suit" symbol comprising the Casino's name) may be added to the four suits or replace one or more of the suits and there would be special payouts for having a Special Flush or ranked hands with significant numbers of the Special Suit, and other bonus payouts for ranked hands without the Special Suit being significant. The bonus may be a fixed bonus or a progressive jackpot in which the amount increases with portions of all wagers or maximum wagers being added from centrally connected devices.

Although specific examples have been provided for the description of the system of the present invention, it is clear to those skilled in the art that alternatives and equivalents to the specific examples may be practiced and yet remain within the scope and intent of the disclosure of the present invention. By way of non-limiting examples, unique hardware and software may be used, and PC-based hardware and software may be used, as well as MAC and Linux and UNIX hardware and software. Mechanical reels as well as video displays may be used. Special sound and video effects may be incorporated into the display of the game. Cash and currency play may be used, credit play, and ticket-in/ticket-out technology may be used to fund the game. The systems may contain player-identification and player tracking technology, as well as security technology that is external and internal to the system, from video monitoring of players, to encryption/authentication programs operating on data transmission in the system. Reel mapping may be physical, statistical, templated, or otherwise provided so that appropriate returns and holds are achieved.

Figure 8:
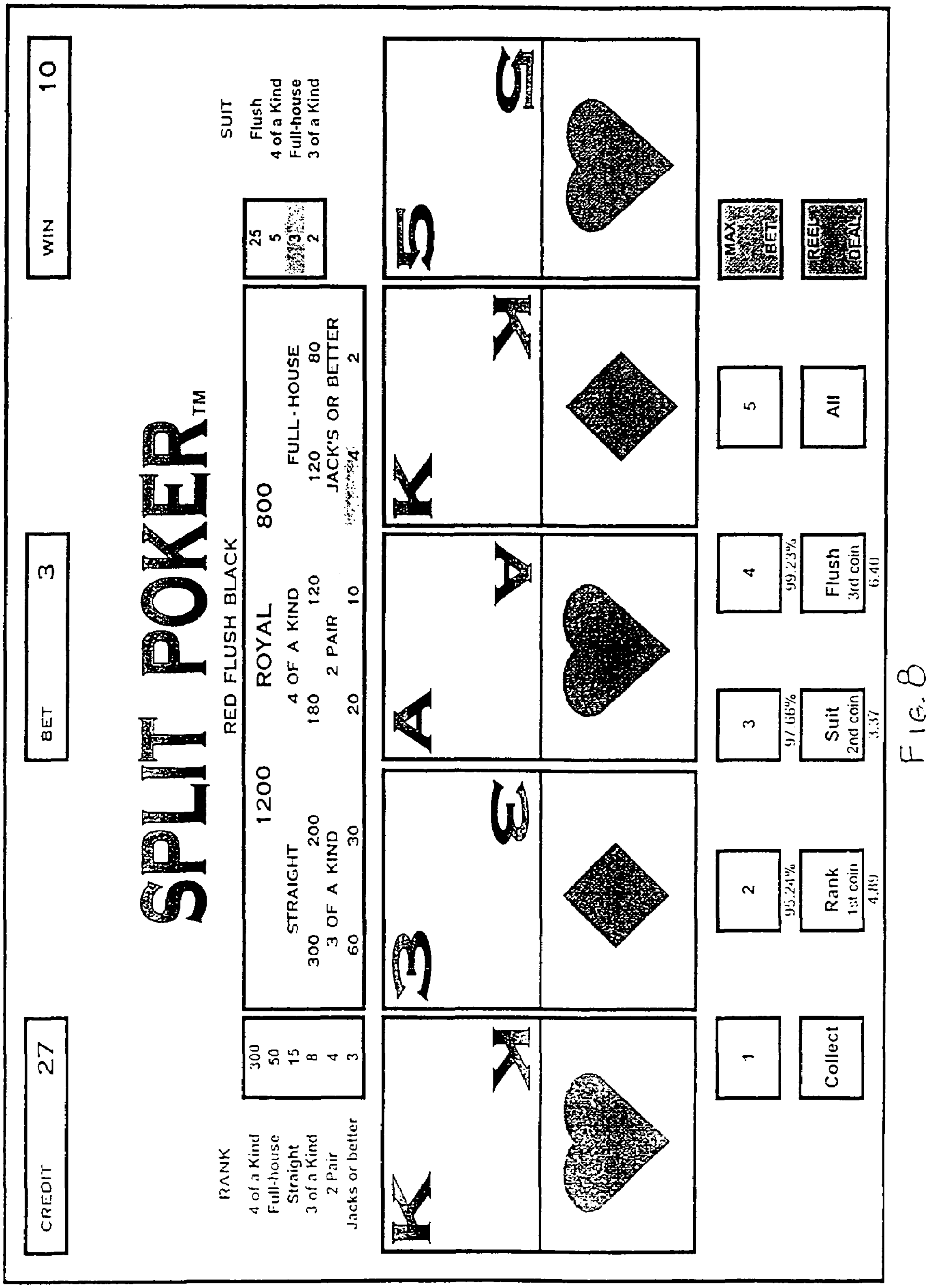
FIG. 8 shows a screen shot of a game variant where there is no order dependency for a winning combination of symbols.

FIG. 8 shows a screen shot of a game variant where there is no order dependency for a winning combination of symbols. In this screen shot, the hand displayed is a Pair of Kings. The screen highlights the cause of a win, Jacks or Better. The percentages shown with respect to wagers placed are indicative of player return potential with respect to the wagers of players.

Figure 9:
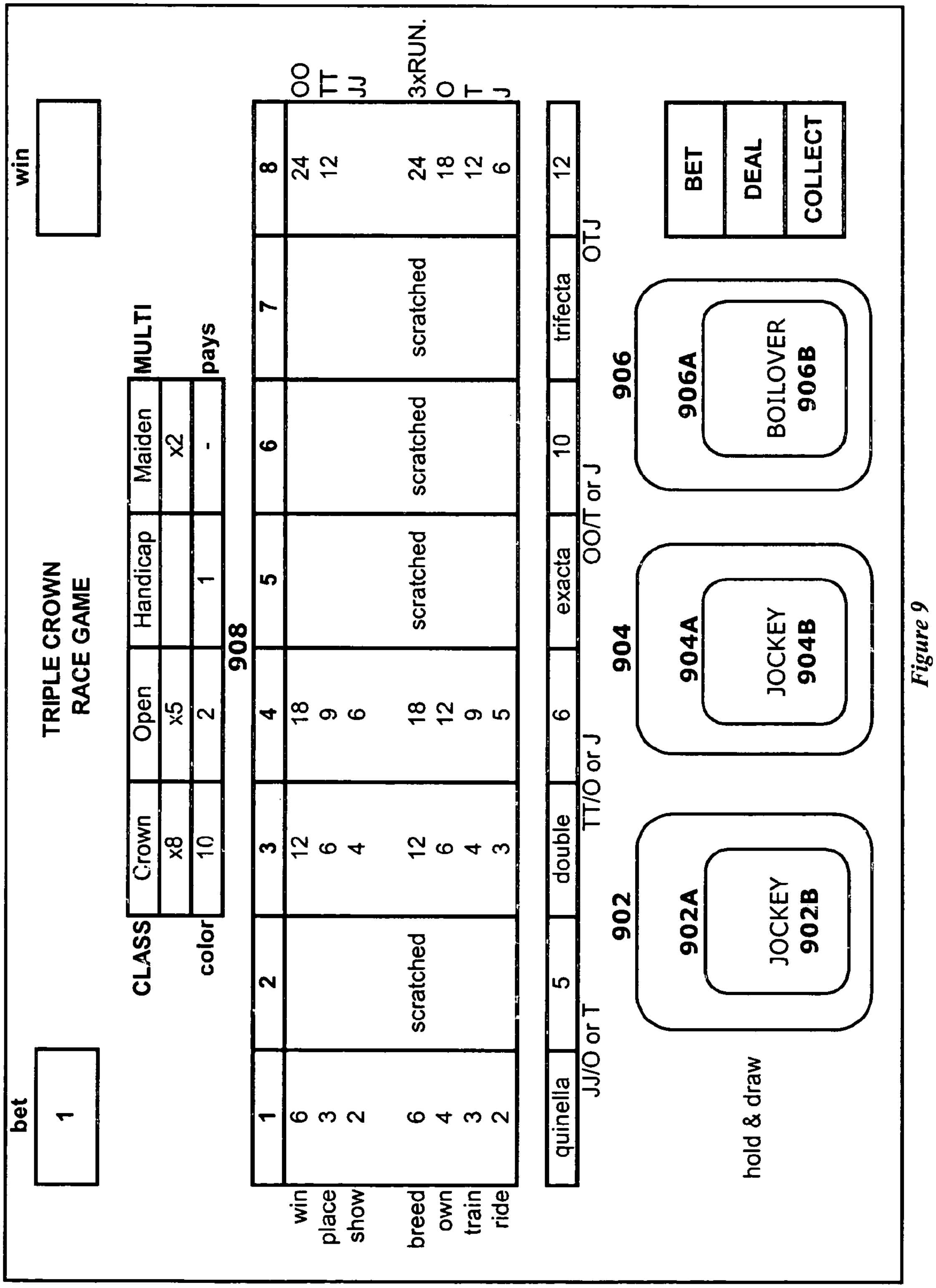
FIG. 9 shows a screen shot of a paytable and display of three symbol areas for use in a version of the described game called “Triple Crown™” video game.

FIG. 9 shows a screen shot of a paytable and display of three symbol areas for use in a version of the described game called "Triple Crown™" video game.

The play of one embodiment of the games of the disclosure may be generally described as follows. A method and apparatus and system (e.g., over the internet, on-line, in banks of machines, on multiplayer game platforms, etc.) are provided for playing a wagering game, preferably with a video display of the indicators, as opposed to a mechanical display of the indicators. The game, by way of non-limiting descriptions and examples may comprise a player placing at least a firsty wager in a wagering machine, the wagering machine when on a video display format (including on-line) having a processor. The wagering machine (after placement of the at least one wager) has the capability of displaying at least a single payline of indicators, with at least three areas for displaying distinct indicators, and up to 4, 5, 6 or seven areas for distinct indicator combinations. An indicator combination means a set comprising a first indicator and a second indicator of a different class. In providing the first symbol, the processor will ultimately or immediately be able to determine from displayed indicators (usually the first indicator, although the nominally described 'second indicator' may be displayed first) on the payline whether the symbols provide at least one of at least two available different odds on the wager that are associated with an award. For example, if the first indicator is a color (there being multiple colors available within the first set of indicators), the processor is capable of recognizing a range of limits of payouts available dependent upon the second indicators. By way of further non-limiting examples, if the colors red, white, blue, green, white, black and yellow were the available first indicators, the appearance in a three-frame image (three sets of first and second indicators are used in determining wagering events) of three red first indicators provides a first available pay table, three white first indicators a second available pay table, three blue first indicators a third available pay table, etc. Similarly, the presence of two red and one yellow may provide a distinct pay table, as do other specific combinations of colors in the provided first indicators. Other combinations may be grouped together into being able to provide a minimum pay table or even a pay table with no payouts (e.g., a first set of red, black and green would have no possible winning combinations with any combination of second indicators). Usually, after the first set of indicators is displayed, there is still a chance for some combination of second indicators that would provide a winning event.

The game play then provides a second set of indicators wherein predetermined combinations and/or orders of the second set of indicators are winning combinations and/or orders based on the wager and their association with first indicators. For example, in the screen shot provided in FIG. 9, there are three areas 902, 904 and 906 where colors are displayed. When the three colors are predetermined combinations (e.g., defined within the game rules), different ranges of ultimate payouts from the pay table 908 are available. The different payouts may be defined or provided in different ways. For example, plateaus of Crown, Group, Open, Handicap, and Maiden are shown on the pay table 908. The plateaus may be operatively (by the processor) in play depending upon the color combinations achieved. For example, if the first indicator set (the three colors) is a high frequency occurrence (e.g., three different colors), only the plateau group of Crown combinations (three Owners, three Trainers or three Jockeys) may provide a winning combination in the second indicators (with a pay table that may be unique for the three different colors, or the same as when the three colors are the same, as is shown in pay table 908.).

When the first set of indicators (the colors) fall into another set of combinations, such as the first two (from left-to-right, for example) colors are the same, a different plateau on the pay table may be included in the game payout possibilities. For example, with the first two indicators being the same color (with or without specifying the third color or the specific combinations of colors), the plateau may now include the Group second indicators of the Triple, Trifecta and Exacta combinations (as defined in the symbol sheet 950 in FIG. 10). The included plateaus may also be available in the reverse order, with the three different colors in the first indicators allowing only the Maiden set of second indicators as winners, and the first two colors being the same allowing the Maiden and Handicap set of second indicators (defined in the symbol, sheet 950 of FIG. 10) as winning combinations in the display of the second indicators. In this manner, the display of the first set of indicators limits the possible winning events and/or the possible winning amounts in advance of when the second indicators are displayed. Different color combinations (or first indicator combinations) may therefore allow for different pay table and symbol combinations in winning events. Different color combinations that might be so differentiated include, by way of non-limiting examples, 3 same colors, three different colors, two same colors, two same colors with a specific third color, two adjacent same colors (first two or last two in a three frame display), two adjacent colors and specific colors, specific orders of colors (e.g., left-to-right, red, white and blue), and the like.

The game may also allow for second wagers after the first set of indicators has been provided. In this way, the player receives an indication of an actual pay table in the case of winning events, and might wish to increase the wager when the first indicators suggest a higher pay table is available. The amount of the wager increase may be a fixed amount (e.g., 2× the initial wager), or may be fixed increments based on the minimum wager (e.g., if the minimum first wager were $X and the maximum were $Y, the player might be able to wager $1×, $2×, $3× . . . $Y, and would either be limited to a maximum wager amount, e.g., $Y or the actual amount of the first wager). It is also possible that if the player makes a wager, some portion of that wager is withdrawn, minimizing expectations of a loss, but possibly forfeiting the opportunity to play the remainder of the game (the second indicators) to conclusion.

At the end of the display of the sets of first indicators and second indicators, the system provides the player with an award dependent both upon the first set of indicators and the second set of indicators displayed on the payline.

The method usually would provide a predetermined number of display areas for providing an equal number of first indicators and second indicators, e.g., 3, 4, 5, 6, 7, etc. pairs of frames or 3, 4, 5, 6, 7, . . . etc. frames where both first and second indicators are shown. In FIG. 9, it is seen that each of the frames 902, 904 and 906 show both the color in regions 902A, 904A, and 906A, and also the seond indicators in spaces 902B, 904B and 906B within the frames 902, 904 and 906. Thus the predetermined number of display areas may equal to the total number of first indicators and second indicators or the predetermined number of display areas is equal to the number of first indicators displayed. In the last case, the second indicators are displayed in the predetermined number of display areas in combination with the first indicator.

The first indicator may be termed for purposes of clarity as a field display indicator. A field display indicator, the first indicator, may provide a general class or set of events, such as the matching or order of colors, patterns (plaids, stripes, dots, etc.) shapes, (triangles, circles, squares, etc.), terms (e.g., horses, tracks, countries), and the like. These field indicators would assist in determining a first order of wager determination, or the field within which winning events and/or winning pay outs would exist. The second indicator would tend to be the more specific indicator, identifying the specific individual indicator where combinations of indicators are important in determining winning events. The specific term indicator may be, for example, selected from the group consisting of a second set of terms or a second set of symbols. The use of terms and symbols associated with racing is particularly desirable.

The method may have the wager may be selected from a predetermined range of value of wagers, and above a predetermined level within the range of wagers, the processor increases a return to player odds for at least one combination of at least a second display other than a maximum payout amount. That is, in addition to or separate from the first indicator altering potential pay tables, Returns to Player, and/or Hit Frequency, the amount of the first and/or second wager can alter potential pay tables, Returns to Player, and/or Hit Frequency. For example, either the mapping or templates may change depending upon the size of the wager, the available winning sets of indicators (first set only, second set only, or combinations) or the pay table may alter with the size of the wager. As an example, when placing a minimum wager only plateau events up to or above the Open Plateau may be available. When placing the Maximum wager, all plateau events are available for a win. The size of the available range of events may be graded between the minimum and maximum wager, or there may be a single or multiple quantitative breaks. For example, with a 5× wager range, 1-2× may enable payouts for Open, Group and Crown, only, 3-4× may enable payouts for Handicap, Open, Group and Crown, only, and 5× may allow payouts for Maiden, Handicap, Open, Group and Crown. The odds on available pay tables may also vary with the change in the size of the wager. The mapping of symbols or the available winning templates may also be varied depending upon the size of the wager. This is substantially different from merely awarding a higher proportional payout for the jackpot, which is often done in poker games. For example, in a 5× range of wagers, the player might receive 500× for a IX wager, 1000× for a 2× wager, 1500× for a 3× wager, 2000× for a 4× wager, and 4000× for a 5× wager, the last being disproportional to the other payout wagers. This is referred to a single event/single wager amount disproportional payout or award.

In the practice of this method and apparatus, the wager may be selected from a predetermined range of value of wagers, and above a predetermined level within the range of wagers, the processor increases a return to player odds for at least one combination of at least a second display other than a maximum payout amount.

Alternatively or in combination with this, the wager may be selected from a predetermined range of value of wagers, and above a predetermined level within the range of wagers, the processor increases hit frequency of winning events during play of the game as compared to hit frequency for winning events when a lower value of wager is made.

Another alternative way of describing play of games within this disclosure is as a gaming apparatus for playing a computer based wagering games. The apparatus (or in the case of an on-line or networked system) may comprise: a housing; a processor; a display monitor; and user interface capacity. The processor is programmed to enable the above described method, including display of the first indicators and the second indicators on the monitor.

Still another alternative description includes a method of playing a video wagering game on a video wagering apparatus, the method comprising:

- a player placing at least a first wager on the video wagering game;
- a processor recognizing the at least one wager;
- the apparatus providing to the view of the player a display of a first set of indicators;
- the apparatus providing to the view of the player a display of a second set of indicators, each indicator in the second set of indicators having a game event relationship with only one indicator in the first set of indicators; and
- resolving the at least first wager based upon rules of the game determining odds returned for predetermined combinations within the first set of indicators and the second set of indicators.

wherein the first set of indicators determines a range of potential award amounts that can be achieved by display of the second set of indicators. In this embodiment within the generic method and apparatus of the described technology, at least some (including all) of the first indicators are revealed before any of the second indicators are displayed, or at least some (including all) of the second indicators are revealed before any of the first indicators are displayed. In the play of the game, the wager may be selected from a predetermined range of value of wagers, and above a predetermined level within the range of wagers, the processor increases a return to player odds for at least one combination of at least a second display other than a maximum payout amount. In another alternative, the wager may be selected from a predetermined range of value of wagers, and above a predetermined level within the range of wagers, the processor increases hit frequency of winning events during play of the game as compared to hit frequency for winning events when a lower value of wager is made.

Figure 10:
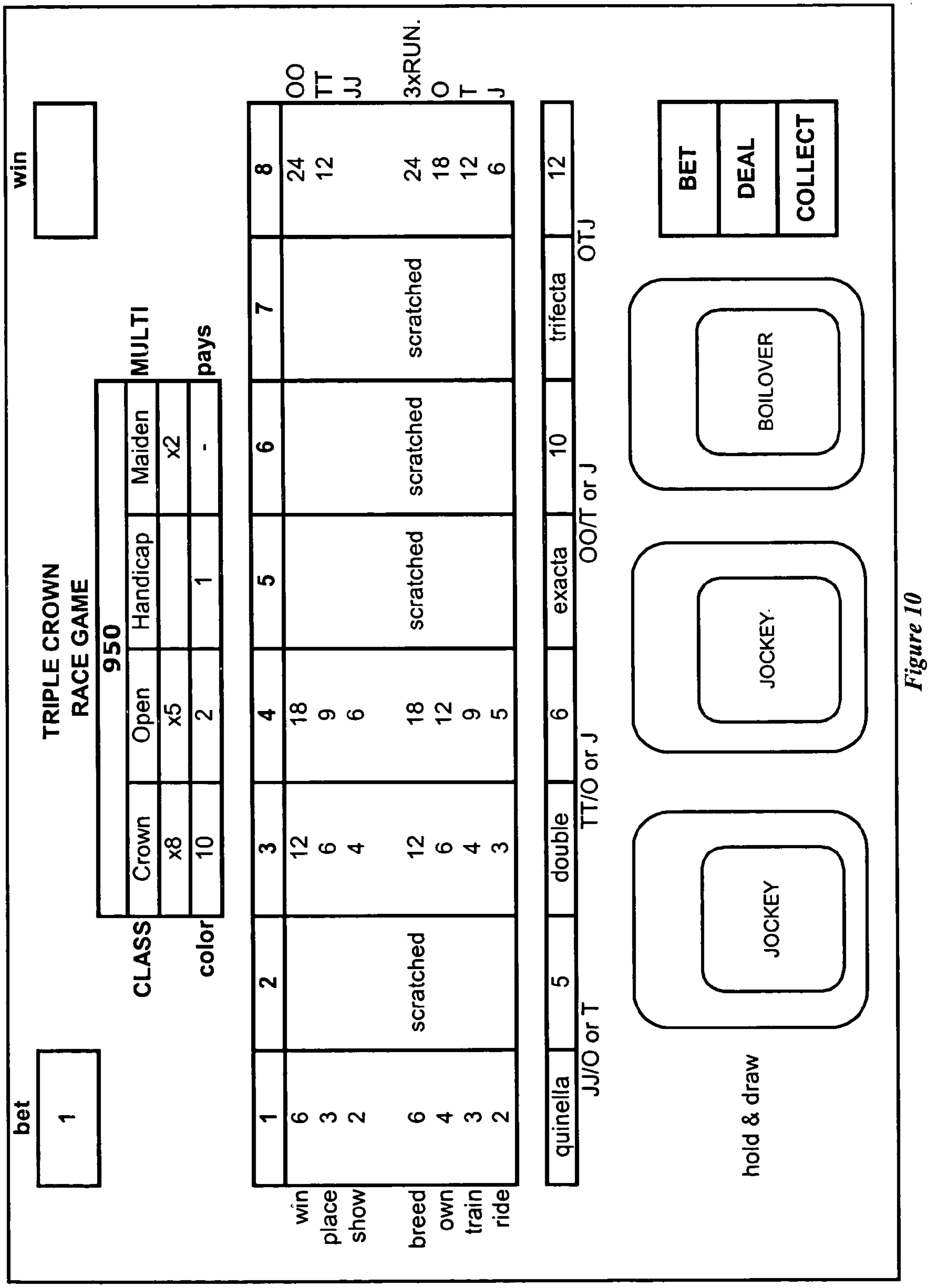
FIG. 10 shows a winning symbol display card that defines the nature of winning inner card combinations.

FIG. 10 shows a winning symbol display card that defines the nature of winning inner card combinations.

Figure 11:
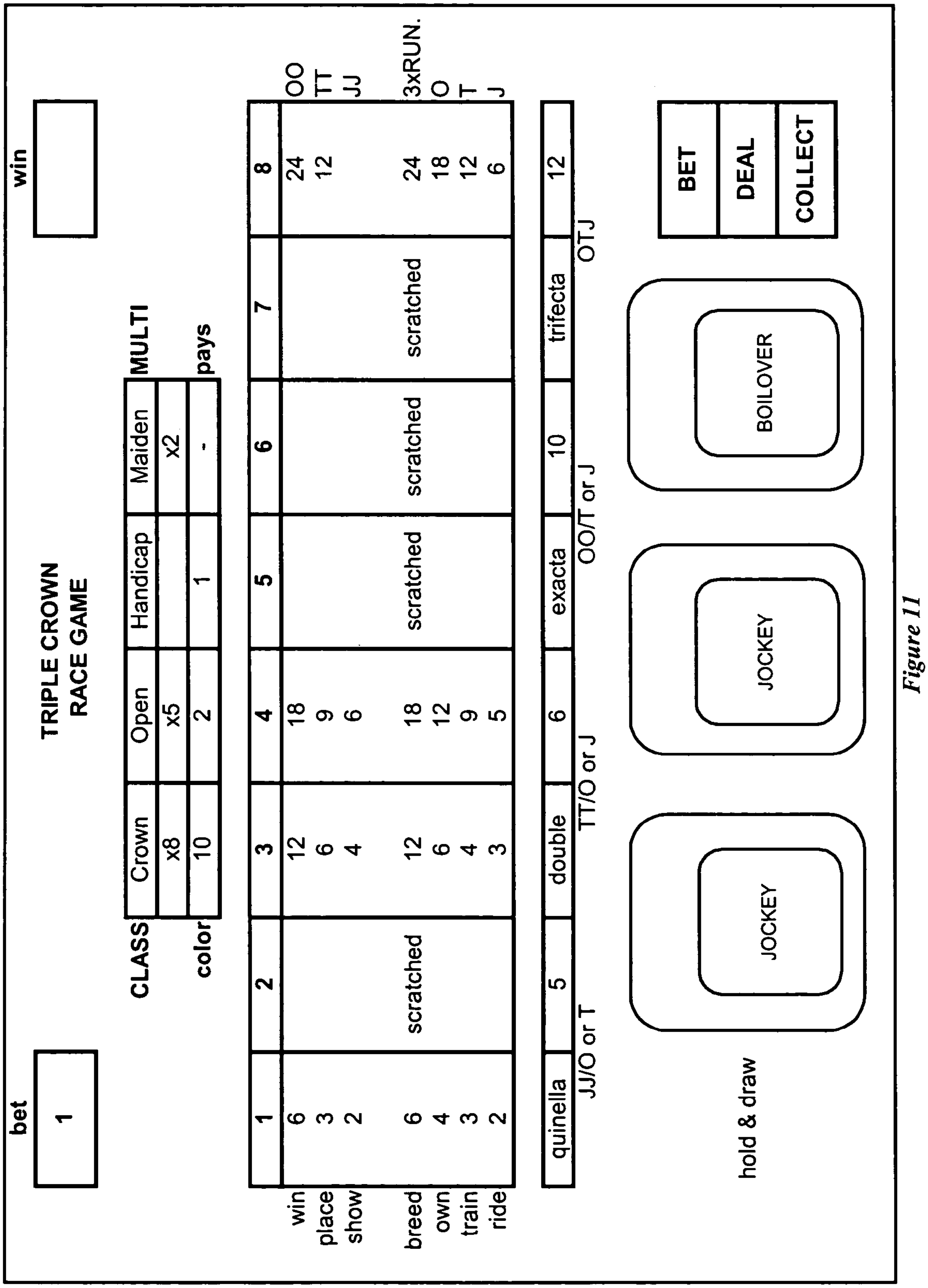
FIG. 11 shows a screen shot of a a variable, randomly selected paytable and display of three symbol areas for use in an alternative version of the described game called “Triple Crown™” video game. In this version, one or both of the Hit Frequency (HF) and Return to Player (RTP) are randomly selected on various (including each) play. This may be a hold or draw game.

FIG. 11 shows a screen shot of a a variable, randomly selected pay table and display of three symbol areas for use in an alternative version of the described game called "Triple Crown™" video game. In this version, one or both of the Hit Frequency (HF) and Return to Player (RTP) are randomly selected on various (including each) play. This may be a hold or draw game.

FIG. 12 shows a screen shot of a pay table and display of three symbol areas for use in a version of a second alternative of the described game called "Triple Crown™" video game.

Figure 1A:
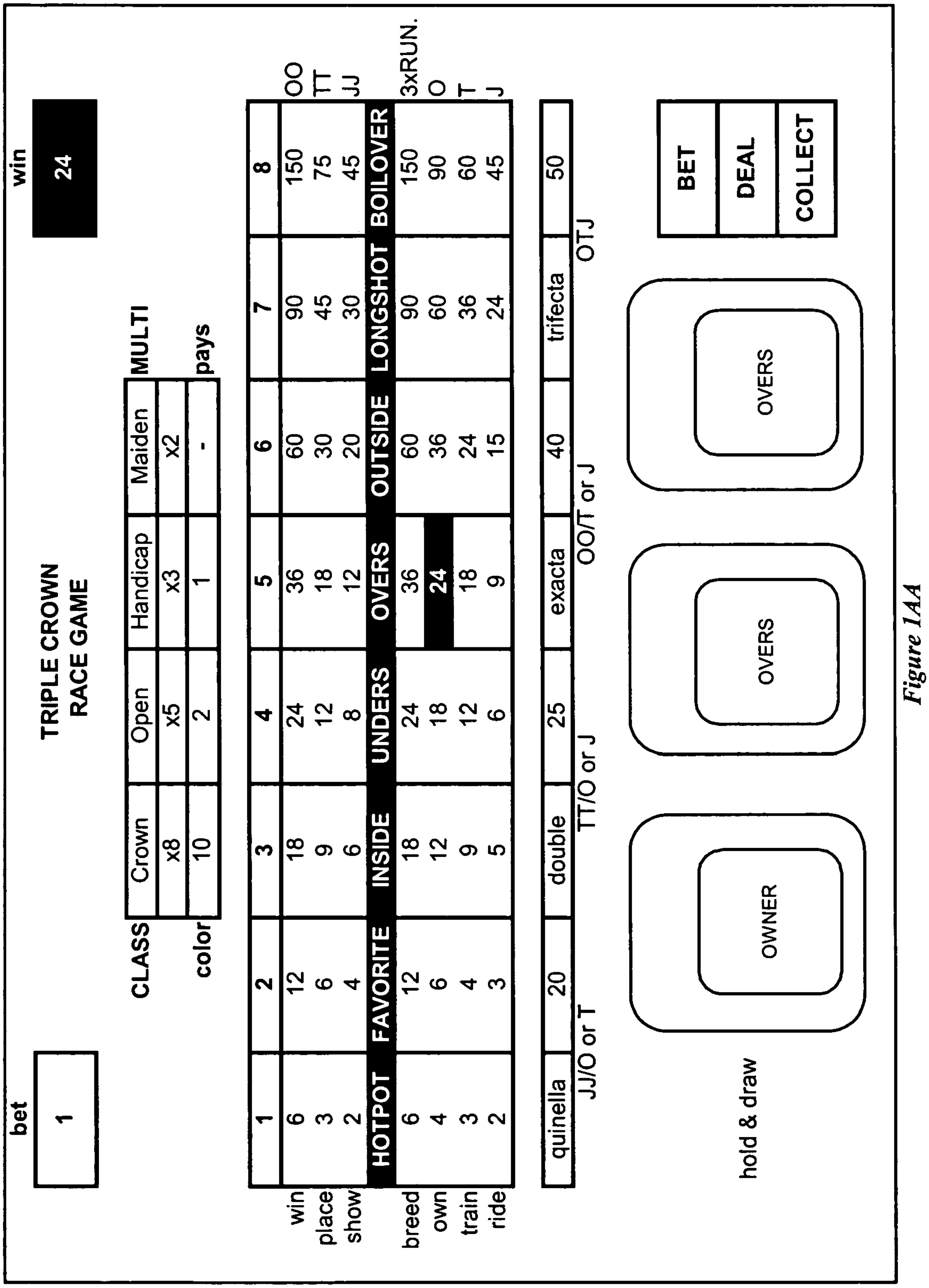
FIG. 1AA shows a screen shot of a game referred to as Triple Crown video game in which no multiplier is achieved from the first indicator and a win is achieved with two Overs and one Owner on the second indicators.

FIG. 1AA shows a screen shot of a game referred to as Triple Crown video game in which no multiplier is achieved from the first indicator and a win is achieved with two Overs and one Owner on the second indicators.

FIG. 2AA shows a screen shot of a game referred to as Triple Crown video game in which a multiplier is achieved from the first indicator, multiplying the win achieved from the second indicators with an Owner, a Jockey and a Trainer.

Figure 3A:
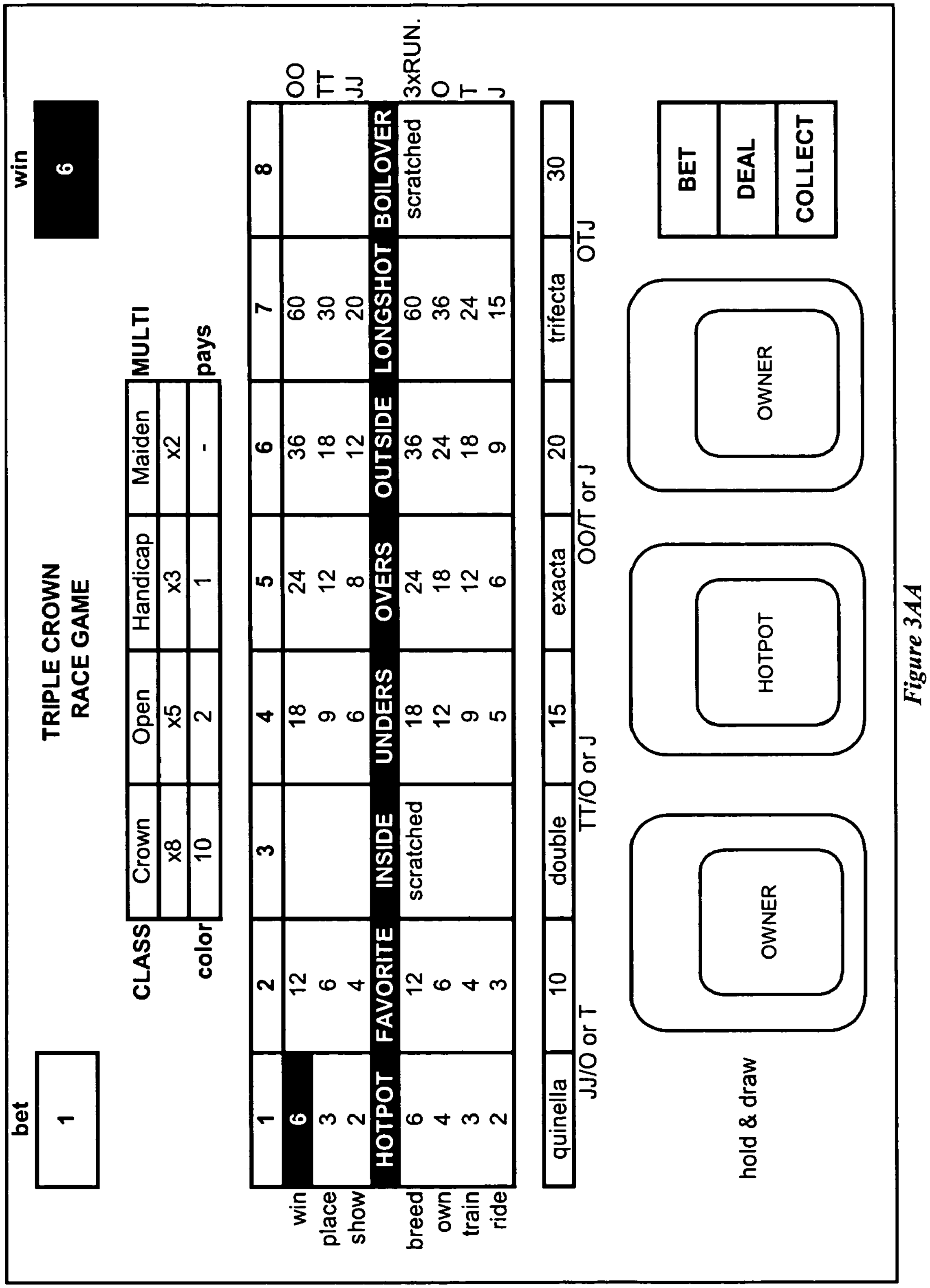
FIG. 3AA shows a screen shot of a game referred to as Triple Crown video game in which no multiplier is achieved from the first indicator and a win is achieved with two Owners and a Hotpot on the second indicators.

FIG. 3AA shows a screen shot of a game referred to as Triple Crown video game in which no multiplier is achieved from the first indicator and a win is achieved with two Owners and a Hotpot on the second indicators.

Figure 4A:
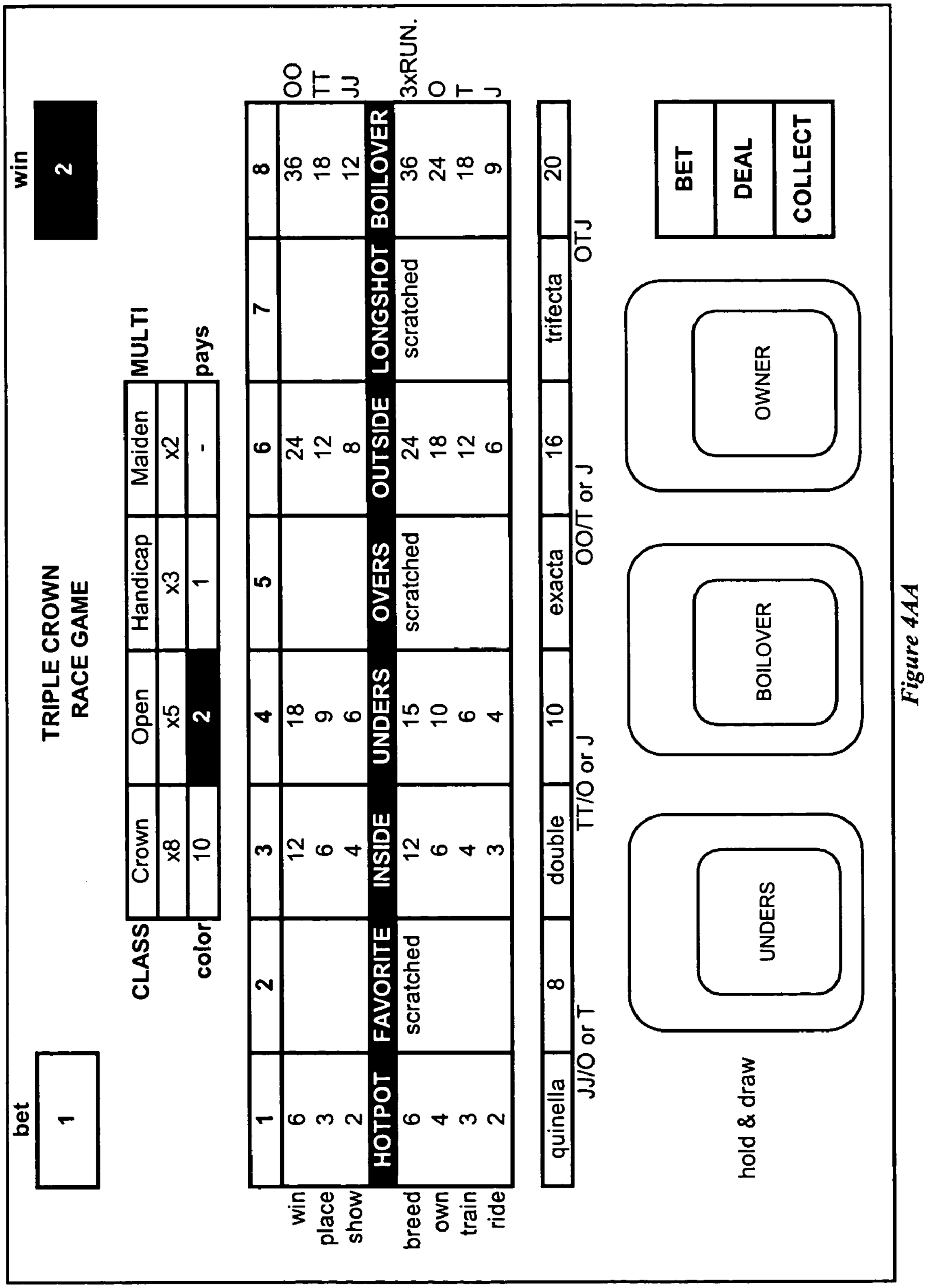
FIG. 4AA shows a screen shot of a game referred to as Triple Crown video game in which no multiplier is available from the first indicator because no win is achieved from the second indicators. However, the event is a win because the first three indicators (the color) are the same.

FIG. 4AA shows a screen shot of a game referred to as Triple Crown video game in which no multiplier is available from the first indicator because no win is achieved from the second indicators. However, the event is a win because the first three indicators (the color) are the same.

Figure 5A:
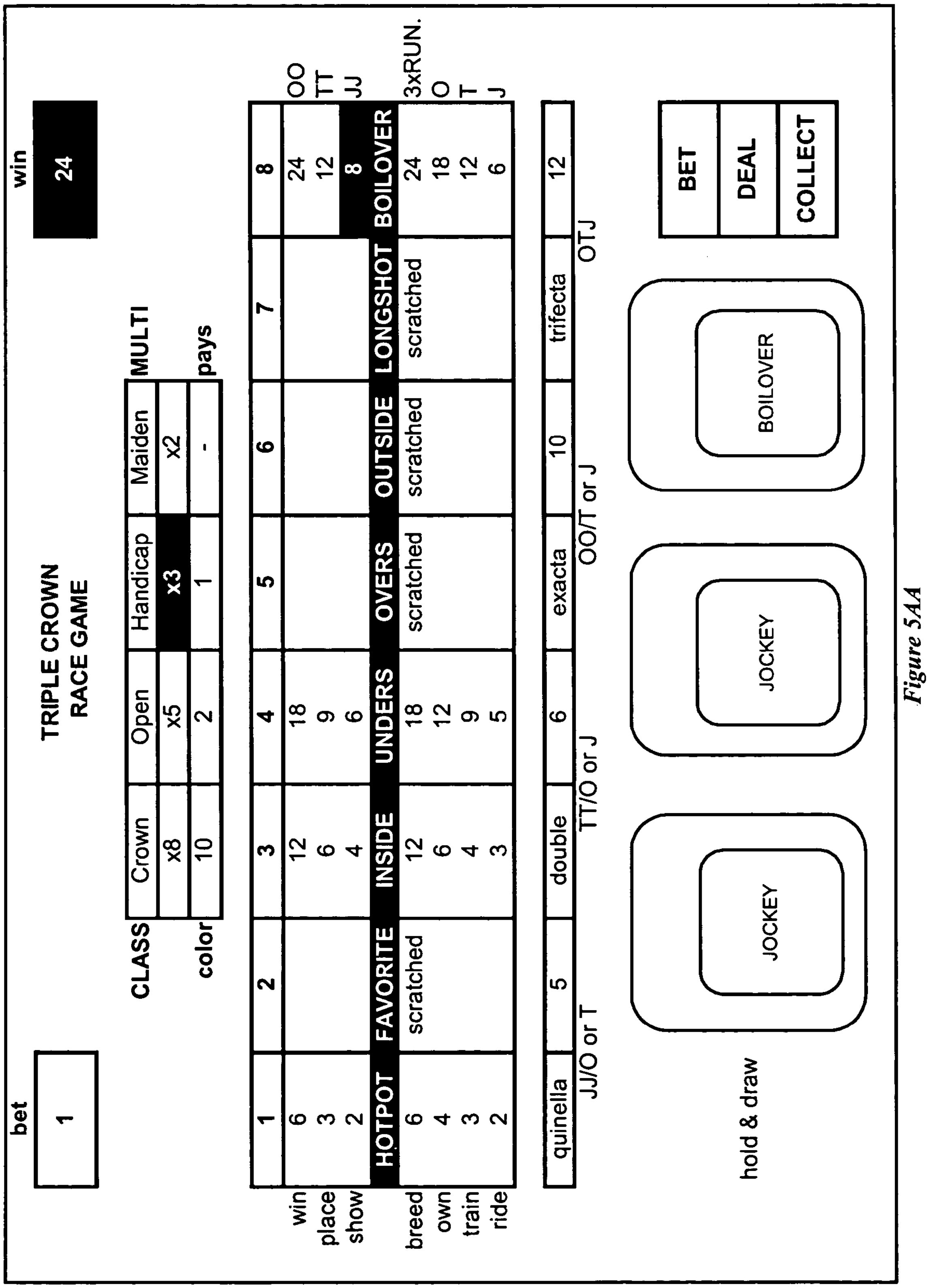
FIG. 5AA shows a screen shot of a game referred to as Triple Crown video game in which a multiplier is achieved from the first indicator and a win is achieved from the second indicators with two Jockeys and a Boilover.

FIG. 5AA shows a screen shot of a game referred to as Triple Crown video game in which a multiplier is achieved from the first indicator and a win is achieved from the second indicators with two Jockeys and a Boilover.

Figure 6A:
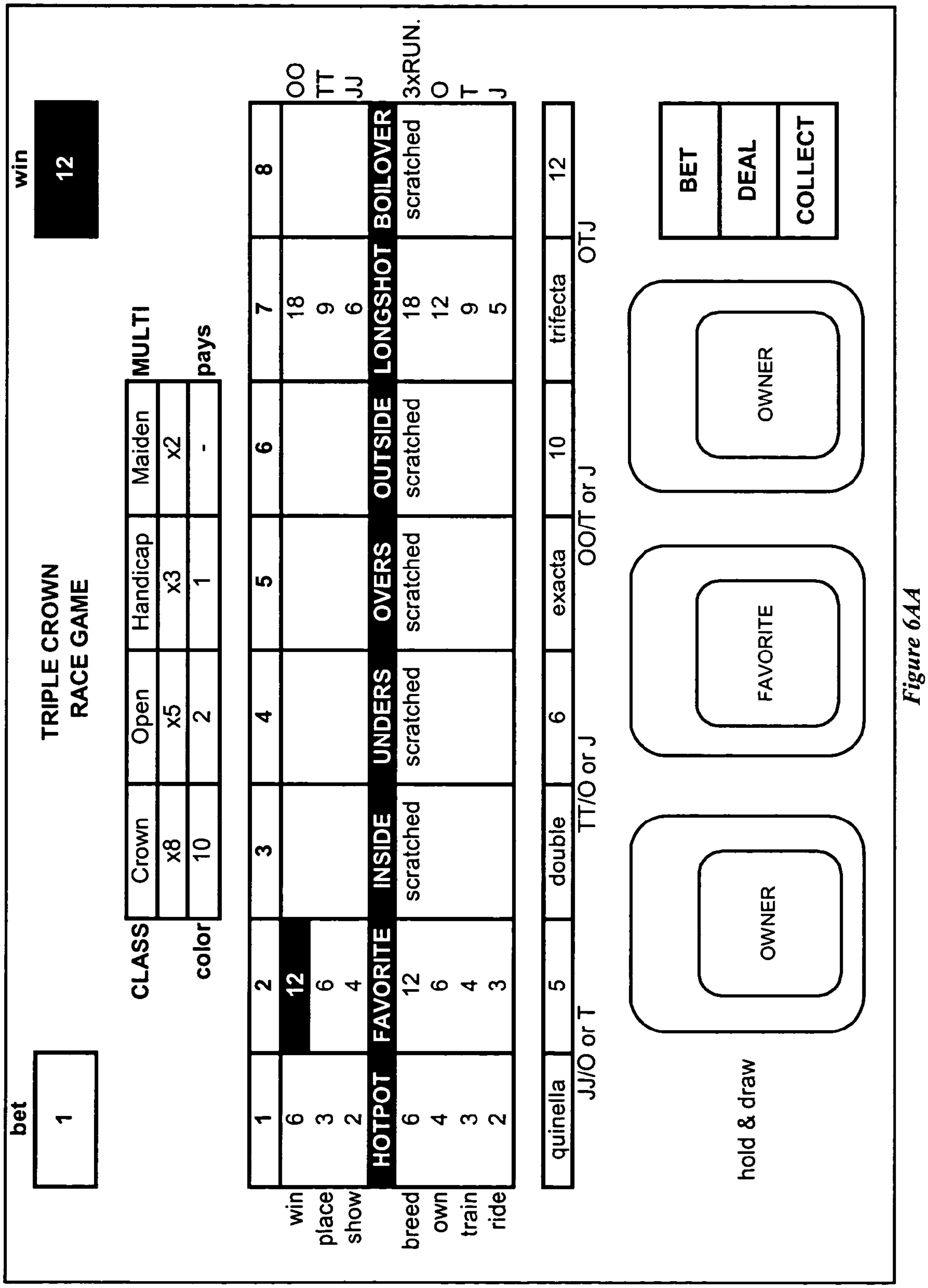
FIG. 6AA shows a screen shot of a game referred to as Triple Crown video game in which a multiplier is achieved from the first indicator and a win is achieved in the second indicators with two Owners and a Favorite revealed.

FIG. 6AA shows a screen shot of a game referred to as Triple Crown video game in which a multiplier is achieved from the first indicator and a win is achieved in the second indicators with two Owners and a Favorite revealed.

FIG. 7AA shows a paytable for the first indicator and second indicator combinations.

FIG. 7AB shows a paytable of events that achieves class multipliers.

FIG. 7BC shows the color pays combinations.

FIG. 7CA shows the paytable for Stakes events.

FIG. 7DA shows the paytable for Tote events.

FIG. 7EA shows the paytable for Exotics events.

FIG. 8AA shows the paytable schedule for Scratched or Elimination Rules.

FIG. 9AA shows one possible mapping format for the probabilities of the Outer Card Deck.

FIG. 10AA shows a paytable with the Make-Up of Winning Combinations.

The following provides a step-by-step description of how an embodiment of the described technology can be played as a game entitled Triple Crown video game.

Step-by-Step Play Description

1. Select Denomination. The game is set-up to be played with 1 coin only, with multi-denomination selections (e.g., $0.25, $0.50, $1, $2, $5, $25 & $100), and no max coin payback incentives.

2. Scratched. The default position of the game is a fixed number of competitors, and for purposes of analysis of the play of the game, a default number of 8 players will be discussed, although different numbers of competitors could clearly be used. From the full field of 8 runners the player can choose to scratch (eliminate) up to 5 of the 8 runners according to the rules. A particularly designated competitor, in this case the runner entitled 'Hotpot,' cannot be scratched. The 'Tote' is divided into 2 groups, where the 1$^{st}$ group is from the runner entitled "Unders" down, and the 2$^{nd}$ group is from the runner entitled "Overs" up. The rule of play is that a player cannot have more 'unders than overs' scratched in an event, but may have equal numbers of both. Note; This feature alone changes the 'Hit frequency (HF)' and 'Payback % (RTP)' of the game. In the examples provided, it can be seen that the changes to these 2 components as runners are scratched (eliminated), where in the 'full 8 runner field' the 'HF' is 1 in 9.28 (10.77%) and the 'RTP' is 99.75%. At the other end of the spectrum where there have been 5 runners scratched (eliminated) and a '3 runner field' is in operation, then the 'HF' has increased to 1 in 3.68 (27.19%) while the 'RTP' has decreased to 91.44%. In summary, fewer hits means more return or more hits means less return. This should satisfy both the player and house alike. It is not known that any video format wagering racing game on the market includes this feature for the player to interact and strategically change their position, especially when the player's bankroll dictates a strategic move.

3. Deal. The color (outer set within a frame and the 1$^{st}$ set of indicators) card is revealed first to determine the class (e.g., must all be the same color) of race, which class has the effect of multiplying any displayed future winning combination (of the race cards) or can pay an award on its own. This payment for the color itself may be available only when a winning combination is not produced in the second deal of the race (inner and 2$^{nd}$ set of indicators) card, which second deal characterizations are revealed after the color (outer) card has been revealed. Note: As soon as the deal button is pressed, the selected denomination is bet and deducted from 'credit balance.'

4. Draw. This is a second interactive component of the game. As in the game 'poker,' the player 'holds & draws' the dealt race (inner) cards only, allowing for an improvement or creation of a winning combination. It is possible for the player to be allowed to discard and draw the outer component (the color), but this is not preferred, and an additional wagering component might be needed to allow for the color component (one or more) to be discarded, because of its direct impact on odds.

Note: The above describes the actual steps of game play, although steps 1 and 2 can maintain the same denomination and field size for as long as the player chooses, or change either or both on each event.

Resolving the Wager.

Firstly, the awards are paid according to the result of the race (inner and 2$^{nd}$ set of indicators) cards. Secondly, if the color (outer and 1$^{st}$ set of indicators) cards are the same, then the first award is multiplied and then paid according to its class distinction (e.g., A triple crown multiplies the initial award by 8). Thirdly, if the race (inner and 2$^{nd}$ set of indicators) cards do not produce a winning combination after the draw has taken place, but the color (outer and 1$^{st}$ set of indicators) components match, then this will result in an award being paid except in the case of the 'maiden' color.

First way to win: The following example demonstrates the win coming in the form of the race (inner and 2$^{nd}$ set of indicators) cards, which in this particular event is called a 'WIN' because of landing the combination of '2 Owners and a Runner (Favorite)'.

Another alternative format for play comprises the following embodiment.

1. Select denomination of the wager.
2. The processor then provides a random field selection (e.g., a set of first indicators, such as the colors, which may be provided on the border of the frames where the random events or indicators are displayed.
3. Possibly a second wager.
4. Possibly a discard and draw of one of the colors (indicators), which could alter potential pay table effects, RTP and HF.
5. Display of the second indicators, after which outer card colors (the first indicators) hold or remain permanent. There may also be a draw of one or more second indicators, and the draw may be limited to a specific position(s) or may be general. The number of draws (replacements) may be limited to 1, 2, 3 or all cards. This is referred to as holding or drawing inner card symbols (the second indicators).

A typical (but non-limiting example of a field determination chart for the pay table (e.g., shown in FIGS. 9, 11 and 12) would be.

| RANK | TYPE | INNER CARD WINNING SYMBOLS |
|---|---|---|
| Owner | Stake | 3 Owners |
| Trainer | Stake | 3 Trainers |
| Jockey | Stake | 3 Jockeys |
| Breeder | Exotic | 3 of the Same Runner |
| Trifecta | Exotic | Owner-Trainer-Jockey |
| Exacta | Exotic | Pair of Owners with a Trainer and Jockey |
| Double | Exotic | Pair of Trainers with an Owner and Jockey |
| Quinella | Exotic | Pair of Jockeys with an Owner and Trainer |
| Win | Field | Pair of Owners with a Runner |
| Place | Field | Pair of Trainers with a Runner |
| Show | Field | Pair of Jockeys with a Runner |
| Color | Color | All Three outer colors the same |

Note;
Crowns are the wild color on outer card colors.

The Display Frames (which May be Referred to as Cards, Even Though Classic Playing Card Images and Ranks are Less Preferred or Even Excluded if Used with Poker Ranks):

The Outer Card; In a preferred embodiment, the outer card (first indicator) is a 'Color' that when matched results in a win or determines the 'Class Multi' (Class Multiplier) to be applied to a winning 'Stake', 'Exotic' or 'Field' wager. The 'Crown' symbol is 'Wild'. When the first indicators are provided or dealet, the outer card will 'Hold' or remain fixed throughout play. It is possible to have the first indicator be replaceable, for 1, 2 3 or all of the first indicators, in a discard and replace format. The 2 outside 'outer cards' (the second indicators) are shown in this non-limiting example to be made up as follows; 1 Crown, 2 Aqua, 3 Orange, 4 Rose & 5 Lavender, whereas the middle 'outer card' has 3 of each color. The 'cycle' is 3375 (15×15×15).

The Inner Card; The Inner card (second identifier) is a symbol that when matched with the same symbol or a combination of mixed symbols can result in a win of a defined and predetermined amount. The above structure of symbols details the winning combinations. 'Hold and Draw', are the options after the deal. An example of the 'inner card' pack may be 3 each of the following symbols; Owner, Trainer, Jockey & a 'Field' which in the above example has 10 Runners (field sizes range between 8-16 runners). The inner card decks number from, 33 cards (8 runner), 36 (9r), 39 (10r), 42 (11r), 45 (12r), 48 (13r), 51 (14r), 54 (15r) and 57 (16r).

Note: The 'Class Multi' (Class Multiplier) is applied only when both the 'Outer' and 'Inner' cards produce winning combinations.

Pay Table:

In this example, there are 4 pay schedules (Colors, Field, Exotic and Stake) in which to win, and as the pay table is prioritized, the highest predetermined combination of a win will be the only combination that will pay. (For example, if there are three Trainers, the payout will be for only three Trainers, not for both three Trainers and a pair of Trainers. The above example demonstrates this by producing a winning 'color' (with a wild) that pays '4 credits', a winning 'field' where 'UNDERS' is the winner paying '8 credits' and because of this result the 'class-multi' came into affect, resulting in 'UNDERS' winning a 'HANDICAP' event multiplying the 'win' dividend by '3' and paying '24 credits'

To summarize the pay table and show how it works, here is the following breakdown.

Class-Multi; This comes into effect when both the 'outer card' color and the 'inner card' combination of symbols connect (connect meansd that the outer card (e.g., color) are the same and create a multiplier and then the inner card forms a winning combination. The classes of events are the 'Triple Crown' (×100), 'Group' (×10), 'Open' (×5), 'Handicap' (×3) and the 'Maiden' (×2).

Stakes; Stakes are won when the 'inner card' symbols produce 3 'Owners' (1000), 'Trainers' (400) or 'Jockeys' (200).

Exotics; can produce 'inner card' winning combinations from a number of ways, through the 'Breeder' (3 of the same Runner), 'Trifecta' (OT&J), 'Exacta' (OO/T or J), 'Double' (TT/O or J) and a 'Quinella' (JJ/O or T).

Field; The 'field' is the 'Totalisator' that produces a dividend based upon an order of favouritism, starting with the 'Favourite' out to the 'Boilover'. These are also 'inner card' winning combinations made up of a 'Win' (OO/runner), a 'Place' (TT/runner) and a 'Show' (JJ/runner).

Colors; These are the only 'outer card' pays, but 'pays' are eliminated if a winning combination is struck on the 'inner cards' where the 'colour' then becomes a 'class multi'.

Note; there are other pay schedules than those demonstrated above, as there are other configurations dependent on which 'Runners' are scratched.

The Playing Deck:

The full playing race card deck consists of 120 cards total. The deck is broken into 2 groups, which are called, the 'Stable' and the 'Field'. The 'stable' group consists of the symbols that represent the Racing personalities of the 'OWNER' (4), the 'TRAINER' (6) and the 'JOCKEY' (8). The rest of the pack consists of the 'field' of 8 runners as described in the above table (see '8 Runners' column).

The Class-Multi Deck:

The 'Class-Multi' deck consists of 30 coloured cards that border the 'playing cards' and determine the class and multiplication factor associated with that colour. There are 4 classes of races; the 'TRIPLE CROWN' (3), the 'OPEN' (6), the 'HANDICAP' (9) and the 'MAIDEN' (12). This deck never configures in this version, like the 'playing cards', but remains the same no matter how many runners are in the 'field'.

How to Play:

1. Select Denomination.
2. Scratching; player decides how many and which runners that will remain in the game according to the scratching rules (see game layout). This is the component of the game that alters the 'HIT FREQUENCY' and 'PAYBACK %'. As a runner is scratched from the event the 'Hit Rate' increases while the 'Payback %' decreases (see top left hand corner on layouts underneath bet amount).

3. Deal. The coloured (class) cards are revealed first to determine whether there will be a multiplier applied to that race (1 game event), followed by the playing cards. (Note: The Colours pay when multiplier doesn't, see pay table)
4. Draw; Player can then hold and draw the playing (race) cards to improve their hand just as in poker.

| Ranks | Make-up of Winning Combinations |
|---|---|
| Owner | 3× Owners |
| Trainer | 3× Trainers |
| Jockey | 3× Jockeys |
| Trifecta | 1 Owner - 1 Trainer - 1 Jockey |
| Exacta | Pair of Owners with a Trainer or a Jockey |
| Double | Pair of Trainers with an Owner or a Jockey |
| Quinella | Pair of Jockeys with an Owner or a trainer |
| Win | Pair of Owners and a Runner |
| Place | Pair of Trainers and a Runner |
| Show | Pair of Jockeys and a Runner |
| Breed | 3× Same Runner |
| Own | An Owner with a pair of the same Runner |
| Train | A Trainer with a pair of the same Runner |
| Ride | A Jockey with a pair of the same Runner |

Notes:

By allowing the player the options of 'Scratching' and 'Hold & Draw', will provide them a strategy of play not seen on any game machine at present. To enable the player to change the 'hit frequency' at will, and make an improvement on the dealt hand will challenge any avid poker player or slot player due to its 'interactive' nature. As a runner is scratched the odds come down (see layouts), but the chances of hitting a prize are increased. This should give more game time at the device and increase the casinos revenue on the game. The result should be a high daily earner.

The Paytable (Top to Bottom):

| CLASS | CROWN | OPEN | HANDICAP | MAIDEN | MULTIPLIER |
|---|---|---|---|---|---|
| | ×8 | ×5 | ×3 | ×2 | |

Class-Multi (Class Multiplier): The color (outer and first set of indicators) cards, where the matching of all three frames results in a multiplying of a winning race (the inner three cards or second set of indicators) combination. This is a second way of winning by multiplying the first initial win. Note that this multiplier applies to winning events without changing the nature of the winning event and may even apply to all winning events in the second indicators. This differentiates from an event, as with playing cards, where changing the suits of a hand would only change winning events in certain limited occasions (a straight becoming a straight flush, all hands becoming flushes, and the like.

| PAYS | 10 | 2 | 1 | — |
|---|---|---|---|---|

Color Pays: If the race (inner and second set of indicators) cards do not produce a winning combination after the draw has taken place, then three outer indicators of the same color may pay, except for the 'Maiden' wager. These prizes are not multipliers, but offer a third way to win.

| JOCKEY | 40 | TRAINER | 30 | OWNER | 400 | STABLE |
|---|---|---|---|---|---|---|

STAKES: These are the three top awards of the game, three identical stable symbols, and the multiplier applies. This is a first way to win.

THE TOTE: These awards are achieved through the outcome of the race (inner and second set) cards. The TOTE is shown in FIG. 12. The left hand side of the 'Tote' indicates the award type (eg win, place etc.) and the right hand side indicates the winning combinations (eg a 'win' award is achieved by producing '2 owners (OO) with a runner', a 'place' award is achieved by producing '2 trainers (TT) and a runner' etc.). Underneath the 'Field' are the award types 'breed, own, train and ride'. The 'breed' is achieved by producing 3 of the same runner known as 'field symbols' (eg. 3 Hotpots), and the rest a made-up of producing 1 'stable symbol' (Owner-O, Trainer-T, Jockey-J) with 2 'field symbols' of the same runner. If you take the highlighted payout in the above example (24), this is the result called 'own', which is made-up of 1 Owner and 2 Overs. The 'Tote' is designed to resemble a real race tote With favorites and longshots. Multipliers apply. This is a first way to win also.

| Quinella | 20 | Double | 25 | Exacta | 40 | Trifecta | 50 |
|---|---|---|---|---|---|---|---|
| JJ/O or T | | TT/O or J | | OO/T or J | | OTJ | |

The Exotics; These awards are shown in the above chart and are achieved through the outcome of the race (inner & $2^{nd}$ set of indicators) cards which are made-up as follows: The award types are in blue to the left of the award (eg. quinella, exacta etc,) and underneath are the combinations required. For example, the 'quinella' is achieved by producing '2 Jockeys with either an Owner or a Trainer (JJ/O or T)', and a 'trifecta' is achieved by producing 1 of each of the 'stable symbols' of 'Owner, Trainer and Jockey (OTJ)'. Multiplier applies. First way to win.

| Ranks | Make-up of Winning Combinations | Type |
|---|---|---|
| Owner | 3× Owners | Stake |
| Trainer | 3× Trainers | Stake |
| Jockey | 3× Jockeys | Stake |
| Trifecta | 1 Owner - 1 Trainer - 1 Jockey | Exotic |
| Exacta | A Pair of Owners + a Trainer or Jockey | Exotic |
| Double | A Pair of Trainers + a Owner or Jockey | Exotic |
| Quinella | A Pair of Jockeys + a Owner or Trainer | Exotic |
| Win | A Pair of Owners + a Runner | Tote |
| Place | A Pair of Trainers + a Runner | Tote |
| Show | A Pair of Jockeys + a Runner | Tote |
| Breed | 3× same Runner | Tote |
| Own | A Owner + a pair of the same Runner | Tote |
| Train | A Trainer + a pair of the same Runner | Tote |
| Ride | A Jockey + a pair of the same Runner | Tote |

The above table details the winning combinations of race (inner & $2^{nd}$ set of indicators) cards.

Alternative Play Formats

Royal Split Poker is a new video poker game. It is played with two sets of symbols: a 52-card deck that contains four cards each of Deuce through Ace with no suits and a 52-card deck that contains thirteen cards each of the four suits with no ranks. The suits and ranks are displayed on five separate "reels" or "frames". The suits are shuffled and dealt. Subsequently the ranks are shuffled and dealt as in ordinary video poker with the 52 ranks in the deck. This is a variant of a species-within the Double Draw event described in detail above.

The player has to make two bets. This $1^{st}$ bet will entitle them to the suit payouts on offer and the second bet will entitle them to the combined suit and rank payouts on offer. Hands with at least four cards of the same suit will pay more than hands that are unsuited. A maximum of 5 coins wagered on each of the $1^{st}$ and $2^{nd}$ bets will qualify for the higher 'A-K-Q-J-10' bonus prize displayed at the top of the pay table. The $1^{st}$ bet must equal the second bet.

If all five reels (cards) show the same suit then it's a Flush.

If any four of the five reels show the same suit then it's a 4 Card Flush.

If the reels show none of the above then it is a Rank.

At the start of a game a suit will be dealt randomly from the suit deck to each of the 5 reels. Suit cards that are dealt will not be replaced. The player now has the option of discarding any suits he dislikes and holding the suits he likes. Once the suits have been replaced, the player will be paid according to the final suit distribution and the suit pay table below, while the initial deal of the ranks is revealed.

Suit Pay Table

| Hand Type | Pay (for 1) |
|---|---|
| 4-card Flush | 1 |
| Flush | 5 |

The player now has the option of discarding and/or holding any ranks. All the suits dealt will remain unchanged regardless of whether the ranks are replaced. Once the ranks are replaced, the player will be paid according to the pay table below:

Pay Table A

| Hand Type | Rank | 4-Card Flush | Flush |
|---|---|---|---|
| A-K-Q-J-10 (Max 5 coins) | 20 | 100 | 800 |
| A-K-Q-J-10 (less than 5 coins) | 20 | 80 | 400 |
| 4 of a Kind | 10 | 50 | 250 |
| Full House | 6 | 15 | 100 |
| Straight | 5 | 10 | 60 |
| 3 of a Kind | 3 | 6 | 30 |
| Two Pair | 2 | 4 | 20 |
| Jacks or Better | 1 | 2 | 10 |

All payouts are "for 1" and per coin.

The player will be paid if the final hand is at least a pair of Jacks or better. An example is given below;

The player has made a 5 coin $1^{st}$ bet and a 5 coin $2^{nd}$ bet.

On the initial deal of the hand, the suit reels reveal five Diamonds. The player holds all five Diamonds.

The five ranks drawn are K-K-K-7-7.

The player opts to hold all ranks.

The player will be paid:

(1) 5×5=25 coins for the flush of 5 Diamonds, and (2) 100×5=500 coins for the "flush full house."

Mathematical Analysis of Alternative Play

To determine the overall return for any pay table for Royal Split Poker, one must determine the optimal strategy for the player. Basically, a computer program has to be written to compute the probability distribution of all pre-draw hands as well as all final hands for which the best play must be determined. The overall return can be computed by multiplying the payouts by the frequency of occurrence of each type of hand and summing up all such products.

First, interim pay tables are constructed based on some educated guess. The probability distribution of the suit reels is then determined. The computer program then starts to cycle through each of 6175 initial 5-card hands with no suits. Then the initial 5 ranks in the current hand will be assigned one of three possible suit distributions, namely, no flush, 4-card flush and 5-card flush. Since for each such 5-card hand there can be $2^5$=32 ways to hold any combination of the five ranks, the program will play each way by replacing the ranks to discard with the ranks from the remaining 47-card deck and the return for each play is calculated. The program then determines the best play for the 5-card hand by comparing the return values of the 32 plays, properly weights the best return value, and records the final hand distribution for the best play. The next 5-card hand is then dealt and examined. Once all 5-card hands have been examined the return for the final hands can be computed by multiplying the payouts by the frequency of occurrence of each type of hand and summing up all such products. Adding the return values of the suit reels to the return we derived yields the overall return for the interim pay tables. If the overall return is over 100% or too low, adjust the payout rates and repeat the entire process until the desired return is attainable.

Using the software described above the following statistics were derived:

Suit Reel Return

| Type | % Probability | Pay | % Return |
|---|---|---|---|
| Rank | 74.6686 | 0 | 0 |
| 4 Card Flush | 22.3138 | 1 | 22.3138 |
| Flush | 3.0177 | 5 | 15.0883 |
| Total | 100.0000 | | 37.4021 |

The hit frequency is 25.3314%.

Pay Table A - Final Hand Distributions and Returns (Less than max coins)

| Final Hand | % Probability | Pay | % Return |
|---|---|---|---|
| Rank | | | |
| A-K-Q-J-10 | 0.321366 | 20 | 6.427325 |
| Four of a Kind | 0.176275 | 10 | 1.762747 |
| Full House | 0.854949 | 6 | 5.129692 |
| Straight | 0.918415 | 5 | 4.592076 |
| Three of a Kind | 5.521464 | 3 | 16.564392 |
| Two Pair | 9.549324 | 2 | 19.098649 |
| Jacks or Better | 15.923172 | 1 | 15.923172 |
| Nothing | 41.403615 | 0 | 0.000000 |
| Total | 74.668580 | | 69.498051 |

-continued

| Pay Table A - Final Hand Distributions and Returns (Less than max coins) | | | |
|---|---|---|---|
| Final Hand | % Probability | Pay | % Return |
| 4-Card Flush | | | |
| A-K-Q-J-10 | 0.108696 | 80 | 8.695664 |
| Four of a Kind | 0.051381 | 50 | 2.569071 |
| Full House | 0.251128 | 15 | 3.766913 |
| Straight | 0.246267 | 10 | 2.462675 |
| Three of a Kind | 1.606117 | 6 | 9.636703 |
| Two Pair | 2.807525 | 4 | 11.230101 |
| Jacks or Better | 4.781921 | 2 | 9.563842 |
| Nothing | 12.460715 | 0 | 0.000000 |
| Total | 22.313751 | | 47.924967 |
| Flush | | | |
| A-K-Q-J-10 | 0.014286 | 400 | 5.714471 |
| Four of a Kind | 0.006947 | 250 | 1.736851 |
| Full House | 0.033919 | 100 | 3.391882 |
| Straight | 0.039071 | 60 | 2.344281 |
| Three of a Kind | 0.216389 | 30 | 6.491680 |
| Two Pair | 0.377315 | 20 | 7.546295 |
| Jacks or Better | 0.640042 | 10 | 6.400419 |
| Nothing | 1.689700 | 0 | 0.000000 |
| Total | 3.017670 | | 33.625880 |

The hit frequency is 44.45%. The return is 151.0489%.

The overall return is 37.4021%+151.0489%=188.4510%, or 94.2255% per coin wagered.

| (Max coins) | | | |
|---|---|---|---|
| Final Hand | % Probability | Pay | % Return |
| Rank | | | |
| A-K-Q-J-10 | 0.321366 | 20 | 6.427325 |
| Four of a Kind | 0.176275 | 10 | 1.762747 |
| Full House | 0.854949 | 6 | 5.129692 |
| Straight | 0.918415 | 5 | 4.592076 |
| Three of a Kind | 5.521464 | 3 | 16.564392 |
| Two Pair | 9.549324 | 2 | 19.098649 |
| Jacks or Better | 15.923172 | 1 | 15.923172 |
| Nothing | 41.403615 | 0 | 0.000000 |
| Total | 74.668580 | | 69.498051 |
| 4-Card Flush | | | |
| A-K-Q-J-10 | 0.109172 | 100 | 10.917228 |
| Four of a Kind | 0.051393 | 50 | 2.569647 |
| Full House | 0.251169 | 15 | 3.767532 |
| Straight | 0.244403 | 10 | 2.444029 |
| Three of a Kind | 1.606653 | 6 | 9.639915 |
| Two Pair | 2.808370 | 4 | 11.233480 |
| Jacks or Better | 4.767496 | 2 | 9.534993 |
| Nothing | 12.475095 | 0 | 0.000000 |
| Total | 22.313751 | | 50.106824 |
| Flush | | | |
| A-K-Q-J-10 | 0.015104 | 800 | 12.083054 |
| Four of a Kind | 0.006896 | 250 | 1.723898 |
| Full House | 0.033757 | 100 | 3.375732 |
| Straight | 0.033801 | 60 | 2.028075 |
| Three of a Kind | 0.214947 | 30 | 6.448404 |
| Two Pair | 0.376407 | 20 | 7.528139 |
| Jacks or Better | 0.633369 | 10 | 6.333685 |
| Nothing | 1.703389 | 0 | 0.000000 |
| Total | 3.017670 | | 39.520987 |

The hit frequency is 44.4179%. The return is 159.1259%. The overall return is 37.4021%+159.1259%=196.5280%, or 98.2640% per coin wagered.

Quad Flush Poker is a new video poker game. It is played with two sets of symbols: a 52-card deck that contains four cards each of Deuce through Ace with no suits and a 52-card deck that contains thirteen cards each of the four suits with no ranks. The suits and ranks are displayed on five separate "reels." The suits are shuffled and dealt. Subsequently the ranks are shuffled and dealt as in ordinary video poker with the 52 ranks in the deck. The player has to make two bets. The 1st bet will entitle them to the suit payouts on offer and the second bet will entitle them to the combined suit and rank payouts on offer. Hands with at least four cards of the same suit will pay more than hands that are unsuited. A maximum of 5 coins wagered on each of the $1^{st}$ and $2^{nd}$ bets will qualify for the higher "Quad" bonus prize displayed at the top of the pay table. The $1^{st}$ bet must equal the second bet.

If all five reels (cards) show the same suit it's a Flush.

If any four of the five reels show the same suit then it's a 4 Card Flush.

If the reels show none of the above then it is a Rank.

At the start of a game a suit will be dealt randomly from the suit deck to each of the 5 reels. Those suit cards that have been dealt will not be replaced. The player now has the option of discarding any suits he dislikes and holding the suits he likes. Once the suits have been replaced, the player will be paid according to the final suit distribution and the suit pay table below, while the initial deal of the ranks is revealed.

| Suit Pay Table | |
|---|---|
| Hand Type | Pay (for 1) |
| 4-card Flush | 1 |
| Flush | 5 |

The player now has the option of discarding and/or holding any ranks. All the suits dealt will remain unchanged whether or not the ranks are replaced. Once the ranks are replaced, the player will be paid according to the pay table below:

| Pay Table A | | | |
|---|---|---|---|
| Hand Type | Rank | 4-Card Flush | Flush |
| 4 of a Kind (5 coins max) | 25 | 200 | 1500 |
| 4 of a Kind (Less than 5 coins) | 25 | 160 | 1000 |
| A-K-Q-J-10 | 11 | 40 | 300 |
| Full House | 6 | 15 | 80 |
| Straight | 5 | 10 | 60 |
| 3 of a Kind | 3 | 6 | 30 |
| Two Pair | 2 | 4 | 20 |
| Jacks or Better | 1 | 2 | 10 |

All payouts are "for 1" and per coin.

The player will be paid if the final hand is at least a pair of Jacks or better.

An example is given below.

The player has made a 5 coin $1^{st}$ bet and a 5 coin $2^{nd}$ bet.

On the initial deal of the hand, the suit reels reveal five Diamonds. The player holds all five Diamonds.

The five ranks drawn are K-K-K-7-7.

| Suit Reel Return | | | |
|---|---|---|---|
| Type | % Probability | Pay | % Return |
| Rank | 74.6686 | 0 | 0 |
| 4 Card Flush | 22.3138 | 1 | 22.3138 |
| Flush | 3.0177 | 5 | 15.0883 |
| Total | 100.0000 | | 37.4021 |

The hit frequency is 25.3314%.

| Pay Table A - Final Hand Distributions and Returns (Less than max coins) | | | |
|---|---|---|---|
| Final Hand | % Probability | Pay | % Return |
| Rank | | | |
| Four of a Kind | 0.177166 | 25 | 4.429160 |
| A-K-Q-J-10 | 0.269698 | 11 | 2.966679 |
| Full House | 0.859709 | 6 | 5.158251 |
| Straight | 0.974925 | 5 | 4.874625 |
| Three of a Kind | 5.560078 | 3 | 16.680234 |
| Two Pair | 9.606311 | 2 | 19.212622 |
| Jacks or Better | 16.092376 | 1 | 16.092376 |
| Nothing | 41.128316 | 0 | 0.000000 |
| Total | 74.668580 | | 69.413948 |
| 4-Card Flush | | | |
| Four of a Kind | 0.053063 | 160 | 8.490055 |
| A-K-Q-J-10 | 0.096029 | 40 | 3.841160 |
| Full House | 0.257043 | 15 | 3.855642 |
| Straight | 0.237639 | 10 | 2.376392 |
| Three of a Kind | 1.668507 | 6 | 10.011042 |
| Two Pair | 2.883720 | 4 | 11.534881 |
| Jacks or Better | 4.799078 | 2 | 9.598155 |
| Nothing | 12.318672 | 0 | 0.000000 |
| Total | 22.313751 | | 49.707326 |
| Flush | | | |
| Four of a Kind | 0.007151 | 1000 | 7.150862 |
| A-K-Q-J-10 | 0.013042 | 300 | 3.912571 |
| Full House | 0.034646 | 80 | 2.771677 |
| Straight | 0.036979 | 60 | 2.218744 |
| Three of a Kind | 0.224094 | 30 | 6.722812 |
| Two Pair | 0.387000 | 20 | 7.739996 |
| Jacks or Better | 0.635199 | 10 | 6.351988 |
| Nothing | 1.679559 | 0 | 0.000000 |
| Total | 3.017670 | | 36.868652 |

The hit frequency is 44.87%. The return is 155.9899%.

The overall return is 37.4021%+155.9899%=193.3920%, or 96.6960% per coin wagered.

| (Max coins) | | | |
|---|---|---|---|
| Final Hand | % Probability | Pay | % Return |
| Rank | | | |
| Four of a Kind | 0.177166 | 25 | 4.429160 |
| A-K-Q-J-10 | 0.269698 | 11 | 2.966679 |
| Full House | 0.859709 | 6 | 5.158251 |
| Straight | 0.974925 | 5 | 4.874625 |
| Three of a Kind | 5.560078 | 3 | 16.680234 |
| Two Pair | 9.606311 | 2 | 19.212622 |
| Jacks or Better | 16.092376 | 1 | 16.092376 |
| Nothing | 41.128316 | 0 | 0.000000 |
| Total | 74.668580 | | 69.413948 |

-continued

| (Max coins) | | | |
|---|---|---|---|
| Final Hand | % Probability | Pay | % Return |
| 4-Card Flush | | | |
| Four of a Kind | 0.053094 | 200 | 10.618791 |
| A-K-Q-J-10 | 0.096076 | 40 | 3.843053 |
| Full House | 0.257181 | 15 | 3.857713 |
| Straight | 0.232838 | 10 | 2.328378 |
| Three of a Kind | 1.670272 | 6 | 10.021631 |
| Two Pair | 2.886961 | 4 | 11.547845 |
| Jacks or Better | 4.806633 | 2 | 9.613265 |
| Nothing | 12.310696 | 0 | 0.000000 |
| Total | 22.313751 | | 51.830676 |
| Flush | | | |
| Four of a Kind | 0.007350 | 1500 | 11.025012 |
| A-K-Q-J-10 | 0.013001 | 300 | 3.900166 |
| Full House | 0.030622 | 80 | 2.449789 |
| Straight | 0.035664 | 60 | 2.139862 |
| Three of a Kind | 0.228639 | 30 | 6.859165 |
| Two Pair | 0.388022 | 20 | 7.760446 |
| Jacks or Better | 0.638083 | 10 | 6.380826 |
| Nothing | 1.676289 | 0 | 0.000000 |
| Total | 3.017670 | | 40.515266 |

The hit frequency is 44.8847%. The return is 161.7599%. The overall return is 37.4021%+161.7599%=199.1620%, or 99.5810% per coin wagered. It should be noted that 13.987% of the time the 1$^{st}$ bet pays when the 2$^{nd}$ bet doesn't. Therefore, the player will win at least one of the bets 58.87% of the time.

The player opts to hold all ranks.

The player will be paid:

(3) 5×5=25 coins for the flush of 5 Diamonds, and (4) 80×5=400 coins for the "flush full house."

Mathematical Analysis

To determine the overall return for any pay table for Royal Split Poker, one must determine the optimal strategy for the player. Basically, a computer program has to be written to compute the probability distribution of all pre-draw hands as well as all final hands for which the best play must be determined. The overall return can be computed by multiplying the payouts by the frequency of occurrence of each type of hand and summing up all such products.

First, interim pay tables are constructed based on some educated guess. The probability distribution of the suit reels is then determined. The computer program then starts to cycle through each of 6175 initial 5-card hands with no suits. Then the initial 5 ranks in the current hand will be assigned one of three possible suit distributions, namely, no flush, 4-card flush and 5-card flush. Since for each such 5-card hand there can be $2^5=32$ ways to hold any combination of the five ranks, the program will play each way by replacing the ranks to discard with the ranks from the remaining 47-card deck and the return for each play is calculated. The program then determines the best play for the 5-card hand by comparing the return values of the 32 plays, properly weights the best return value, and records the final hand distribution for the best play. The next 5-card hand is then dealt and examined. Once all 5-card hands have been examined the return for the final hands can be computed by multiplying the payouts by the frequency of occurrence of each type of hand and summing up all such products. Adding the return values of the suit reels to the return we derived yields the overall return for the interim pay tables. If the overall return is over 100% or too low, adjust the payout rates and repeat the entire process until the desired return is attainable. Using the software described above the following statistics were derived:

Although specific details have been provided in the description of the examples and generic play, one skilled in the art would recognize that these specific examples are representative of a genus and are not intended to limit the scope of the description or enablement to only those examples. In the case of the "Suit Smart" button function, other generic symbols instead of card suits may be used. The function is to enable games designed with double drawing ability, as with the games described above, a fast first draw to keep game speed up whilst increasing wagering options.

What is claimed:

1. A method of playing a wagering game on a computer system comprising:

a player placing a wager in a wagering machine having a processor;

the wagering machine displaying at least a single payline of multiple frames, each frame including at least two predetermined display areas influenced by at least two indistinct indicators;

the processor providing and causing to be displayed a first set of first symbols with one first symbol for a first predetermined display area of each frame;

the player electing to keep or discard at least one first symbol from the first set of first symbols;

the processor providing and causes to be displayed final replacement first symbols for any discarded first symbols to provide a second set of first symbols;

only after first symbols are first displayed and after any discarded first symbols have been replaced, the processor providing and causing to be displayed a third set of second symbols with one second symbol directly associated with each final first symbol in the second set of first symbols, wherein the second symbols are displayed in a second predetermined display area for each frame;

the player electing to keep or discard at least one second symbol from the third set of second symbols;

the processor providing and causing to be displayed final and random replacement second symbols for any discarded second symbols to form a final fourth set symbols having the at least two distinct indicators comprising one first symbol in a frame and one second symbol associated with each frame; and the processor resolving the wager on the basis of the first symbols and second symbols in the fourth set of symbols.

2. The method of claim 1, wherein the predetermined number of display areas are for providing an equal number of first symbols and second symbols.

3. The method of claim 2 wherein the predetermined number of display areas is equal to the total number of first symbols and second symbols.

4. The method of claim 2 wherein the first symbols are playing card suits and the second symbols are playing card ranks.

5. The method of claim 4 wherein when the player elects to keep or discard at least one second symbol from the third set of second symbols, the player may discard only the rank to be randomly replaced after any replacements of first symbols in a separate step.

6. The method of claim 4 wherein when the player elects to keep or discard at least one second symbol from the third set of second symbols, the player may discard a) only the rank, b) only the suit, or c) both the rank and the suit with random replacement of a), b) or c).

7. The method of claim 1 wherein the first symbol comprises a field display symbol.

8. The method of claim 7 wherein the field display symbol comprises a symbol selected from the group consisting of a color, a pattern, a shape, a first set of terms or the first set of symbols.

9. The method of claim 8 wherein the second symbol displayed is a specific term symbol.

10. The method of claim 9 wherein the specific term symbol is selected from the group consisting of a second set of terms or a second set of symbols.

11. The method of claim 1 wherein the resolution of the wager is based upon poker rank.

12. A gaming apparatus for playing a computer based wagering game comprising:

a housing;

a processor;

a display monitor; and user interface capacity;

wherein the processor is programmed to perform the method of claim 1, including display of the first symbols and the second symbols on the monitor.

13. A gaming apparatus for playing a computer based wagering game comprising:

a housing;

a processor;

a display monitor; and user interface capacity;

wherein the processor is programmed to perform the method of claim 10, including display of the first symbols and the second symbols on the monitor.

14. A gaining apparatus for playing a computer based wagering game comprising:

a housing;

a processor;

a display monitor; and user interface capacity;

wherein the processor is programmed to perform the method of claim 4, including display of the first symbols and the second symbols on the monitor.

15. A gaming apparatus for playing a computer based wagering game comprising:

a housing;

a processor;

a display monitor; and user interface capacity;

wherein the processor is programmed to perform the method of claim 7, including display of the first symbols and the second symbols on the monitor.

16. A gaming apparatus for playing a computer based wagering game comprising:

a housing;

a processor;

a display monitor; and user interface capacity;

wherein the processor is programmed to perform the method of claim 5, including display of the first symbols and the second symbols on the monitor.

* * * * *